(12) United States Patent
Choi et al.

(10) Patent No.: US 9,582,542 B2
(45) Date of Patent: Feb. 28, 2017

(54) DEVICE AND CONTENT SEARCHING METHOD USING THE SAME

(71) Applicant: SAMSUNG ELECTRONICS CO., LTD., Suwon-si (KR)

(72) Inventors: Won-jong Choi, Daejeon (KR); Hyung-tak Choi, Suwon-si (KR); O-hoon Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/013,490

(22) Filed: Aug. 29, 2013

(65) Prior Publication Data

US 2014/0067861 A1    Mar. 6, 2014

(30) Foreign Application Priority Data

Aug. 29, 2012 (KR) .......................... 10-2012-0095261

(51) Int. Cl.
*G06F 17/30* (2006.01)

(52) U.S. Cl.
CPC .. *G06F 17/30522* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,962,500 B2 | 6/2011 | van Zwol et al. | |
| 2002/0032878 A1* | 3/2002 | Karpf | G06F 19/3431 714/1 |
| 2002/0168117 A1 | 11/2002 | Lee et al. | |
| 2003/0039410 A1* | 2/2003 | Beeman | G06F 17/30277 382/305 |
| 2009/0281997 A1* | 11/2009 | Jain | G06F 17/30864 |
| 2010/0211575 A1 | 8/2010 | Collins et al. | |
| 2011/0076663 A1* | 3/2011 | Krallman | G09B 7/00 434/362 |
| 2012/0016879 A1* | 1/2012 | Groux et al. | 707/737 |

FOREIGN PATENT DOCUMENTS

| | | |
|---|---|---|
| GB | 2434230 A | 7/2007 |
| WO | 2012/008940 A1 | 1/2012 |
| WO | 2012/040676 A1 | 3/2012 |

OTHER PUBLICATIONS

International Search Report for PCT/KR2013/007767 dated Dec. 30, 2013 [PCT/ISA/210].
Written Opinion for PCT/KR2013/007767 dated Dec. 30, 2013 [PCT/ISA/237].
Communication dated Sep. 23, 2016 issued by the European Patent office in counterpart European Patent Application No. 13182260.3.

* cited by examiner

*Primary Examiner* — Son T Hoang
(74) *Attorney, Agent, or Firm* — Sughrue Mion, PLLC

(57) ABSTRACT

A device and method for searching for content, the device including: a display; a storage configured to store a plurality of contents; an inputter configured to receive a user answer to a question displayed on the display for searching for content stored in the storage; and a controller configured to determine, based on the plurality of contents, the question, output, through the display, the determined question, determine, based on the user answer to the output question, a criterion for searching for content, and output, through the display, a search result searched based on the criterion.

15 Claims, 23 Drawing Sheets

| | CONTENT-GENERATED TIME | | | | CONTENT-GENERATED DATE | | | | | CONTENT-GENERATED PLACE | | | CONTENT TYPE | | | | CONTENT-PLAYED DATE | | | | | ... |
|---|---|---|---|---|---|---|---|---|---|---|---|---|---|---|---|---|---|---|---|---|---|---|
| | DAWN (0~6h) | MORNING (6~12h) | AFTERNOON (12~18h) | EVENING (18~24h) | WITHIN 1 YEAR | BETWEEN 1 & 3 YEARS | BETWEEN 3 & 5 YEARS | BETWEEN 5 & 10 YEARS | 10 YEARS OR MORE | A AREA | B AREA | C AREA | IMAGE | MOVING PICTURE | TEXT | MUSIC | WITHIN 1 YEAR | BETWEEN 1 & 3 YEARS | BETWEEN 3 & 5 YEARS | BETWEEN 5 & 10 YEARS | 10 YEARS OR MORE | ... |
| CONTENT 1 | | ✓ | | | | ✓ | | | | ✓ | | | ✓ | | | | | | | ✓ | | ... |
| CONTENT 2 | | ✓ | | | | | ✓ | | | ✓ | | | ✓ | | | | | | ✓ | | | ... |
| CONTENT 3 | ✓ | | | | ✓ | | | | | | ✓ | | | | | ✓ | ✓ | | | | | ... |
| CONTENT 4 | | | ✓ | | | | | ✓ | | ✓ | | | | ✓ | | | | | | | ✓ | ... |
| CONTENT 5 | ✓ | | | ✓ | | | | | | ✓ | ✓ | | | | ✓ | | | | | | | ... |
| ... | | | | | | | | | | | | | | | | | | | | | | ... |

FIG. 3

| | CONTENT-GENERATED TIME | | | | CONTENT-GENERATED DATE | | | CONTENT-GENERATED PLACE | | | | CONTENT TYPE | | | | CONTENT-PLAYED DATE | | | | |
|---|---|---|---|---|---|---|---|---|---|---|---|---|---|---|---|---|---|---|---|---|
| | DAWN (0~6h) | MORNING (6~12h) | AFTERNOON (12~18h) | EVENING (18~24h) | WITHIN 1 YEAR | BETWEEN 1 & 3 YEARS | BETWEEN 3 & 5 YEARS | BETWEEN 5 & 10 YEARS | 10 YEARS OR MORE | A AREA | B AREA | C AREA | ... | IMAGE | MOVING PICTURE | TEXT | MUSIC | WITHIN 1 YEAR | BETWEEN 1 & 3 YEARS | BETWEEN 3 & 5 YEARS | BETWEEN 5 & 10 YEARS | 10 YEARS OR MORE | ... |
| CONTENT 1 | | | ✓ | | | | | ✓ | | ✓ | | | | ✓ | | | | | | | ✓ | | ... |
| CONTENT 2 | | ✓ | | | | | ✓ | | | ✓ | | | | ✓ | | | | | | ✓ | | | ... |
| CONTENT 3 | ✓ | | | | ✓ | | | | | | ✓ | | | | | | ✓ | ✓ | | | | | ... |
| CONTENT 4 | | | | ✓ | | | | | ✓ | | | ✓ | | | ✓ | ✓ | | | ✓ | | | ✓ | ... |
| CONTENT 5 | | ✓ | | | | ✓ | | | | | | ✓ | | | | | | | | | | | ... |
| ... | | | | | | | | | | | | | | | | | | | | | | | ... |

DEVICE AND CONTENT SEARCHING METHOD USING THE SAME

CROSS-REFERENCE TO RELATED APPLICATION(S)

This application claims priority from Korean Patent Application No. 10-2012-0095261, filed on Aug. 29, 2012 in the Korean Intellectual Property Office, the disclosure of which is incorporated herein by reference in its entirety.

BACKGROUND

1. Field

Apparatuses and methods consistent with exemplary embodiments relate to providing a device and a content searching method using the same, and more particularly, to providing a device that searches for contents based on a user control and a content searching method using the same.

2. Description of the Related Art

Recent developments in electronic technologies have resulted in increased storage spaces that may be used by electronic devices, such as a portable phone, a camera, a personal computer (PC), etc., to store contents. Therefore, the number of contents stored in the electronic devices has gradually increased.

Users input search words into the electronic devices or search for contents one by one through mouse or touch controls. As a result, a large amount of time is taken to search for desired contents. In particular, this inconvenience increases with an increase in the number of contents.

Accordingly, a simpler method of easily searching for contents is required.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

Aspects of one or more exemplary embodiments provide a device that outputs a question for searching for contents and a plurality of selectable answers to the question, and searches for and provides contents based on one of the plurality of selectable answers selected by a user, and a content searching method using the same.

According to an aspect of an exemplary embodiment, there is provided a device including: a display; a storage configured to store a plurality of contents; an inputter configured to receive a user answer to a question displayed on the display for searching for content stored in the storage; and a controller configured to determine, based on the plurality of contents, the question, output, through the display, the determined question, determine, based on the user answer to the output question, a criterion for searching for content, and output, through the display, a search result searched based on the criterion.

The plurality of contents may include at least one of an image and a moving picture.

The controller may control the display to output a plurality of options selectable as answers to the question.

The controller may check a plurality of sorting criteria for sorting the plurality of contents based on metadata of each of the plurality of contents and generate the question based on numbers of sorting groups sortable according to the plurality of sorting criterions.

The controller may generate, as the question, a question about a sorting criterion, among the plurality of sorting criterions, in which the number of the sortable sorting groups is greatest.

The display may display a user interface (UI) screen for searching for contents, and, if a search word is input through the UI screen, the controller may extract contents corresponding to the search word and determine the question based on the extracted contents.

According to an aspect of another exemplary embodiment, there is provided a device including: an inputter configured to receive an input of a user answer for searching for content; a storage configured to store a plurality of contents; a display configured to output first and second questions for searching for content; and a controller configured to determine, based on a first user answer to the first question, a first criterion for searching for content, determine, based on a second user answer to the second question, a second criterion for searching for content, and output one or more search results searched based on the first and second criterions.

The controller may control the display to output a plurality of options selectable as answers to each of the first and second questions.

The controller may search for contents corresponding to the first criterion among the plurality of contents and, if a number of contents corresponding to the first criterion is greater than or equal to a preset number, generate the second question based on the first search result.

The controller may determine sorting criterions for sorting the contents corresponding to the first criterion based on metadata of each of the contents corresponding to the first criterion and determine the second question based on numbers of sorting groups sortable according to the sorting criterions.

The controller may determine, as the second question, a question about a sorting criterion in which the number of the sortable sorting groups is greatest.

According to an aspect of another exemplary embodiment, there is provided a method of searching for content of a device configured to store a plurality of contents, the method including: determining, based on the plurality of contents, a question for searching for content; providing the question to a user; determining, based on a user answer to the question, a criterion for searching for content; and providing the user with a first search result searched based on the criterion.

The plurality of contents may include at least one of an image and a moving picture.

The providing the question to the user may include providing the user with a plurality of options selectable as answers to the question.

The generating the question may include: determining a plurality of sorting criterions for sorting the plurality of contents based on metadata of each of the plurality of contents; and determining the question based on numbers of sorting groups sortable according to the sorting criterions.

A question about a sorting criterion in which the number of the sortable sorting groups is greatest may be determined as the question.

The method may further include: displaying a UI screen for searching for contents; and if a search word is input through the UI screen, extracting contents corresponding to the search word, wherein the question is determined based on the extracted contents.

According to an aspect of another exemplary embodiment, there is provided a method of searching for contents of a device configured to store a plurality of content, the method including: providing, based on the plurality of contents, a first question for searching for content to a user;

determining a first criterion for searching for content based on a first user answer to the first question; providing a second question for searching for content to the user; acquiring a second criterion for searching for content based on a second user answer to the second question; and providing the user with one or more search results searched based on the first and second criterions.

The providing the first question to the user may include providing a plurality of options selectable as answers to the first question, and the providing the second question to the user may include providing a plurality of options selectable as answers to the second question.

The providing the second question to the user may include searching for contents corresponding to the first criterion among the plurality of contents and, if a number of the contents corresponding to the first criterion is greater than or equal to a preset number, generating the second question based on the first search result.

The providing the second question to the user may include: determining sorting criterions for sorting contents corresponding to the first criterion based on metadata of each of the contents corresponding to the first criterion and generating a second question based on the number of sorting groups sortable according to each of the sorting criterions.

The providing the second question to the user may include determining, as the second question, a question about a sorting criterion in which the number of the sortable sorting groups is greatest.

According to an aspect of another exemplary embodiment, there is provided a device including: an outputter configured to output an image signal; an inputter configured to receive a user input; and a controller configured to determine, based on a first plurality of contents, a first question for searching for content, control the outputter to output the determined first question, receive, through the inputter, a first input of a first user answer to the first question, and determine a first search result searched based on the first user answer to the first question.

According to an aspect of another exemplary embodiment, there is provided a method of searching for content, the method including: outputting, based on a first plurality of contents, a first question for searching for content; receiving a first input of a first user answer to the first question; and determining a first search result searched based on the first user answer to the first question.

As described above, according to various exemplary embodiments, a question for searching for contents and an answer for searching the contents in response to the question may be provided based on the metadata of the contents, and the corresponding contents may be searched and provided based on the user's answer. Accordingly, users may be provided with contents which are searched more easily and accurately.

BRIEF DESCRIPTION OF THE DRAWINGS

The above and/or other aspects will be more apparent by describing certain exemplary embodiments with reference to the accompanying drawings, in which:

FIG. 3 is a table illustrating attribution information stored in a storage unit according to an exemplary embodiment;

DETAILED DESCRIPTION OF EXEMPLARY EMBODIMENTS

Figure 1:
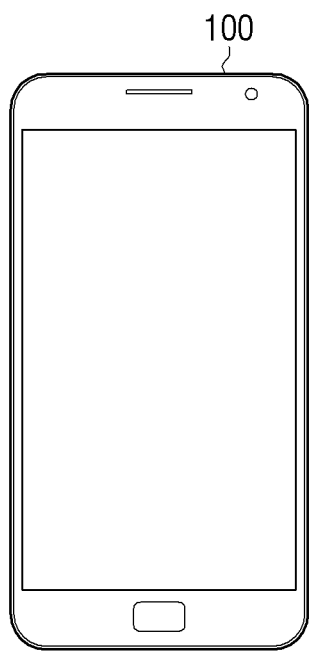
FIG. 1 is a view illustrating a content searching method according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail. It is understood that expressions such as "at least one of," when preceding a list of elements, modify the entire list of elements and do not modify the individual elements of the list.

FIG. 1 is a view illustrating a content searching method according to an exemplary embodiment. A device 100 may be realized as a portable phone such as a smart phone as shown in FIG. 1 or may be realized as various types of devices that are portable and have display or output functions such as a portable multimedia player (PMP), a personal digital assistant (PDA), a table personal computer (PC), a navigation system, an image processing device, etc. Alternatively, the device 100 may be realized as a portable device or a stationary device such as a television (TV), a set-top box, a stationary image processing device, a monitor, a kiosk PC, or the like.

The device 100 outputs a question for searching for contents, and searches for and provides desired contents based on a user's answer to the question. Here, the contents may include an image, a moving picture, a text, music, etc., and may be stored in a storage space of the device 100 or in an external server that is connected to the device 100 through a network.

In detail, the device 100 checks a sorting criterion of the contents by using metadata about the contents, and generates and outputs a question corresponding to the sorting criterion in which the number of sorting groups is greatest when the contents are sorted into a plurality of groups according to the sorting criterion, and for inquiring an answer to the question. The device 100 also searches for contents, from among a plurality of contents, corresponding to the selected answer and provides the searched contents to a user.

Here, the metadata is data including attribute information about the contents and may include times when the contents are generated, locations of the contents, a use history of the contents, etc.

For example, the number of groups into which the contents are sorted based on the generated locations of the contents (i.e., a location where the content was generated), among various types of information of the metadata, may be greater than the number of groups into which the content is sorted by using other types of information. In this case, the device 100 may output a question for inquiring the generated location of the content, such as "Where was the content generated?", and may output the groups (i.e., the possible generated locations of the content, e.g., area A, area B, or area C, . . . ) as selectable answers to the question. Therefore, if the user selects the area B, the device 100 may search for and output contents that are generated in the area B, among a plurality of contents.

Figure 2:
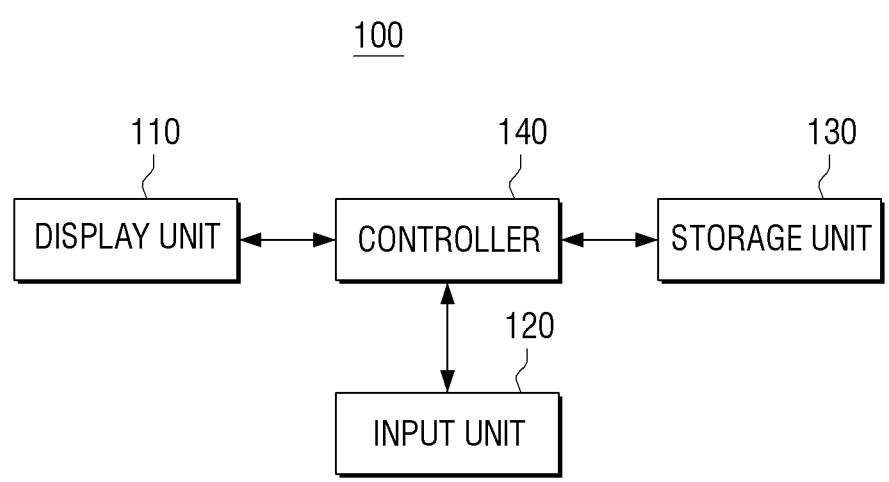
FIG. 2 is a block diagram illustrating a structure of a device according to an exemplary embodiment.

FIG. 2 is a block diagram illustrating a structure of a device 100 according to an exemplary embodiment. Referring to FIG. 2, the device 100 includes a display unit 110 (e.g., a display), an input unit 120 (e.g., an inputter), a storage unit 130 (e.g., storage), and a controller 140.

The display unit 110 displays various types of user interface (UI) screens.

In detail, the display unit 110 may display a UI screen including a question for searching for contents and a plurality of options (i.e., a plurality of selectable answers) selectable as answers to the question, a UI screen for inputting a search word, etc. The question may correspond to a sorting criterion and the plurality of options may correspond to groups (i.e., sorting groups) for the sorting criterion.

For this purpose, the display unit 110 may be realized as a liquid crystal display (LCD), an organic light-emitting diode (OLED), a plasma display panel (PDP), etc.

The display unit 110 may be realized as a touch screen type that has a layer structure with a touch pad to sense a touch control of a user performed on a displayed UI screen.

For example, the display unit 110 may receive a touch control of the user for selecting at least one of the plurality of options displayed on the UI screen. The display unit 110 may receive a touch control of the user for selecting a search window that is displayed on the UI screen to input a search word. In this case, the display unit 110 may overlap a virtual keyboard with the UI screen to display the virtual keyboard on the UI screen and receive a touch control of the user under which the search word is input through the virtual keyboard.

The input unit 120 receives a user answer for searching the content. For this purpose, the input unit 120 may be realized as a touch pad, a key pad including various types of functional keys, numerical keys, special keys, character keys, etc., a touch screen type, a rotatable dial, a clickable input device, etc. Furthermore, the input unit 120 may be realized as, or include, an infrared (IR) receiver that receives a remote control signal transmitted from a remote controller for controlling the device 100.

In detail, the input unit 120 may receive a user command for searching for contents, a user command for selecting at least one of the plurality of options displayed on the UI screen, a user command for inputting a search word, a user command for inputting a search stop, etc. For example, the user moves a cursor displayed on the UI screen through the keypad to an answer that the user wants to select and inputs a confirm button to select at least one from among the plurality of options. Users may input search words into the search window displayed on the UI screen through the keypad.

In particular, if the input unit 120 is realized as a touch screen type along with the display unit 110, the input unit 120 may receive a touch control of a user who selects an option to a question and a touch control of the user for inputting a search word.

The storage unit 130 may store a plurality of contents. In detail, the storage unit 130 may include a content database (DB) including the plurality of contents. Here, the contents may include at least one of an image, a moving picture, a text, an audio file such as music, etc.

For this purpose, the storage unit 130 may include a storage medium of at least one of a flash memory type, a hard disk type, a multimedia card micro type, a card type of memory (for example, an SD or XD memory, or the like), a random access memory (RAM), a read only memory (ROM), etc. While the present exemplary embodiment stores the plurality of contents in the storage unit 130, it is understood that one or more other exemplary embodiments are not limited thereto. For example, according to another exemplary embodiment, the plurality of contents may be stored remotely (e.g., in a server).

The storage unit 130 may store content attribute information. In detail, the storage unit 130 may store content attribute information, which is generated based on metadata extracted from each of the contents, in a table form. This will be described in more detail below.

The controller 140 controls an overall operation of the device 100. In detail, the controller 140 extracts metadata respectively from the plurality of contents that constitute the content DB. Here, the metadata may include at least one of generated times of the contents (i.e., a time at which the content was generated), generated locations of the contents, generated date of the contents (i.e., a date at which the content was generated), types of the contents, titles of the contents, generation information of the contents, played dates of the contents (e.g., a last date at which the content was played), played times of the contents, played locations of the contents (e.g., a location where the content was last played), content playing devices, content storing devices, content generating devices, devices that have transmitted the contents to the device 100, persons included in the contents, information about places included in the contents, and content transmitting devices.

The controller 140 may generate the content attribute information in a table form (hereinafter referred to as an attribute information table) based on the metadata extracted respectively from the plurality of contents and store the content attribute information in the storage unit 130.

FIG. 3 is a view illustrating an attribute information table stored in a storage unit 130 according to an exemplary embodiment.

The controller 140 may extract metadata from each content and generate an attribute information table by using various types of information included in the metadata. For example, as shown in FIG. 3, the attribute information table may include information about a content generated time, a content generated date, a content generated location, a content type, a content played date, etc.

In detail, the controller 140 respectively maps a plurality of contents to corresponding generated time zones to generate the attribute information table based on the content generated time included in the metadata. For example, the controller 140 sorts the content generated time zone into dawn (0:00-6:00), morning (6:00-12:00), afternoon (12:00-18:00), and evening (18:00-24:00), maps the plurality of contents to corresponding time zones, and stores the plurality of contents that have been mapped to the corresponding time zones. In other words, as shown in FIG. 3, first and second contents may map to an afternoon time zone, a third content may map to a dawn time zone, a fourth content may map to an evening time zone, and a fifth content may map to a morning time zone. The number of sorting groups may be predetermined or set according to a predetermined rule (e.g., based on a number of different values for the content generated time included in the metadata). Similarly, the types of sorting groups may be predetermined or set according to a predetermined rule (e.g., based on the values for the content generated time included in the metadata, or directly correspond to the different values for the content generated time included in the metadata).

The controller 140 respectively maps the plurality of contents to corresponding sections to generate the attribute information table based on the content generated date included in the metadata. For example, the controller 150 may sort the content generated date into a range within 1 year, a range between 1 and 3 years, a range between 3 years and 5 years, a range between 5 years and 10 years, and a range of 10 years or more. In other words, as shown in FIG. 3, the first content may map to the range between 5 years and 10 years, the second content may map to the range between 3 years and 5 years, the third content may map to the range within 1 year, the fourth content may map to the range of 10 years or more, and the fifth content may map to the range between 1 year and 3 years.

The controller 140 generates the attribute information table by using the content generated location included in the metadata. For example, if the content generated location extracted from the metadata is expressed as latitude/longitude coordinates or Global Positioning System (GPS) information, the controller 140 may determine an area in which the content has been generated, by using the latitude/longitude coordinates or the GPS information, map each content to a corresponding area, and store the mapped content. In other words, as shown in FIG. 3, the first and second contents may map to the area A, the third content may map to the area B, and the fourth and fifth contents may map to the area C.

The controller 140 also generates the attribute information table by using the content type included in the metadata. For example, the controller 140 may map each content to a corresponding content type and store the mapped content. In other words, as shown in FIG. 3, the first and second contents may map to images, the third content may map to music, the fourth content may map to a text, and the fifth content may map to a moving picture, and the mapped first, second, third, fourth, and fifth contents may be stored.

Also, the controller 140 may respectively map the plurality of contents to corresponding sections to generate the attribute information table based on the content generated date included in the metadata. For example, the controller 140 may divide the content generated date into a range within 1 year, a range between 1 year and 3 years, a range between 3 years and 5 years, a range between 5 years and 10 years, and a range of 10 years or more, map the plurality of contents to corresponding sections, and store the mapped contents. In other words, the first content may map to the range between 5 years and 10 years, the second content may map to the range between 3 years and 5 years, the third content may map to the range within 1 year, the fourth content may map to the range of 10 years or more, and the fifth content may map to the range between 1 year and 3 years, and the mapped first, second, third, fourth, and fifth contents may be stored.

The attribute information table shown in FIG. 3 stores information about the content generated time, the content generated date, the content generated position, the content type, and the content played date. However, this is an exemplary embodiment for description of convenience, and it is understood that one or more other exemplary embodiments are not limited thereto. The controller 140 may generate the attribute information table by using various types of information included in the metadata, e.g., information about a content playing device, a content playing location, a content playing time, a content-included person, a content-included place, etc.

For example, the controller 140 may generate the attribute information table by using a device that stores contents included in the metadata. For example, the controller 140 may respectively map contents to corresponding content storing devices and store the content storing devices in the attribute information table. The controller 140 may generate the attribute information table by using a device that generates contents included in the metadata. For example, the controller 140 may respectively map the contents to content generating devices and store the content generating devices in the attribute information table.

If a new content is stored in the storage unit 130, the controller 140 may extract metadata from the new content and update the attribute information table based on the extracted metadata. In detail, the controller 140 may control to map each content to corresponding information by using information about a generated time, a generated date, a generated location, a type, a played date, a playing device, a played location, a played time of the new content, a person included in the new content, a place included in the content, etc., to update the attribute information table and store the updated attribute information table in the storage unit 130.

The controller 140 generates a first question for searching for contents based on a plurality of contents and outputs the first question through the display unit 110.

In detail, the controller 140 may check sorting criteria for sorting a plurality of contents based on metadata of each of the plurality of contents and generate the first question based on the number of sorting groups sortable according to each sorting criterion. In this case, the controller 140 may generate a question about a sorting criterion in which the number of sortable sorting groups is maximum, as the first question.

For this purpose, the controller 140 may use the attribute information table stored in the storage unit 140. In detail, when sorting contents by using various types of information included in the metadata as sorting criterions, the controller 140 calculates the number of sorting groups sortable according to the sorting criterions with reference to the attribute information table.

For example, 10 contents are stored in the storage unit 130, and an exemplary attribute information table generated based on the stored contents is shown in Table 1 below.

TABLE 1

| | Content Generated Location | | | Content Generated Time | | | | Content Playing Device | |
|---|---|---|---|---|---|---|---|---|---|
| | A Area | B Area | C Area | Dawn (0~6) | Morning (6~12) | Afternoon (12~18) | Evening (18~24) | A Device | B Device |
| Content 1 | | | | | | ∨ | | ∨ | |
| Content 2 | | ∨ | | | ∨ | | | ∨ | |
| Content 3 | ∨ | | | | | ∨ | | | ∨ |
| Content 4 | ∨ | | | | | ∨ | | | ∨ |
| Content 5 | ∨ | | | | | ∨ | | | ∨ |
| Content 6 | | | ∨ | | | | ∨ | ∨ | |
| Content 7 | | ∨ | | | | | | | ∨ |
| Content 8 | ∨ | | | | | ∨ | | ∨ | |
| Content 9 | | | ∨ | | | | ∨ | ∨ | |
| Content 10 | ∨ | | | ∨ | | | | ∨ | |

Referring to Table 1, first through tenth contents may be sorted into contents that are respectively generated in areas A, B, and C, according to content generated locations. Therefore, when sorting the first through tenth contents according to the content generated locations as the sorting criterion, the controller 140 may determine sortable sorting groups as an A area group, a B area group, and a C area group and calculate the number of sorting groups as 3.

Referring to Table 1, the first through tenth contents may be sorted into contents that are generated in dawn, morning, afternoon, and evening time zones, according to content generated times. Therefore, when sorting the first through tenth contents according to the content generated times as the sorting criterion, the controller 140 may determine sortable sorting groups as a dawn time zone group, a morning time zone group, an afternoon time zone group, and an evening time zone group and calculate the number of sorting groups as 4.

Referring to Table 1, the first through tenth contents may be sorted into contents that are played in devices A and B, according to content playing devices as the sorting criterion. Therefore, when sorting the first through tenth contents according to the content playing devices, the controller 140 may determine sortable sorting groups as an A device group and a B device group and calculate the number of sorting groups as 2.

Therefore, if an attribute information table as shown in Table 1 is stored in the storage unit 130, a sorting criterion in which the number of sorting groups is greatest may be a content generated time. Accordingly, the controller 140 may generate a question for inquiring a content generated time (for example, "At what time was the content generated?) as the first question and output a UI screen including the first question through the display unit 110.

In this case, the controller 140 may control the display unit 110 to output a plurality of options selectable as answers to the first question. In other words, the controller 140 may generate a plurality of selectable answers to the first question, provide a UI screen including the first question, and display the UI screen through the display unit 110.

In detail, the controller 140 may generate a plurality of selectable answers including titles (i.e., labels) of sorting groups that are sorted according to a sorting criterion in which the number of sorting groups is greatest, with reference to the attribute information table. As shown in Table 1 above, when contents are sorted according to the content generated time, the number of sorting groups is greatest. Therefore, the controller 140 generates titles "dawn", "morning", "afternoon", and "evening" of sorting groups sorted according to content generated times as a plurality of selectable answers to the first question. The controller 140 may provide a UI screen including a question "At what time was the content generated?" and selectable answers "dawn", "morning", "afternoon", and "evening" to the question and display the UI screen through the display unit 110.

In the above-described exemplary embodiment, a first question and a plurality of options selectable as answers to the first question are displayed through one UI screen, but this is only an example. In other words, the controller 140 may provide additional UI screens respectively including a first question and a plurality of options selectable as answers to the first question and sequentially display the UI screens through the display unit 110 according to one or more other exemplary embodiments.

The controller 140 may acquire a first criterion for searching for contents based on a user answer to the first question and control the display unit 110 to output a first search result searched based on the first criterion.

In detail, if one of the plurality of options selectable as answers to the first question is selected, the controller 140 may determine the selected option as a first criterion and search for contents corresponding to the first criterion among a plurality of contents stored in the storage unit 130.

For example, the user may select "afternoon" as an answer to the question "At what time was the content generated?" In this case, the controller 140 may determine first, third, fourth, fifth, and eighth contents as contents that are generated in an afternoon time zone with reference to the attribute information table and output the first, third, fourth, fifth, and eighth contents through the display unit 110.

Here, the controller 140 may play contents searched according to the first criterion or may display a list of contents searched according to the first criterion through the display unit 110. The list of contents may include titles, generated times, played times, thumbnail images, etc., of the contents.

For example, if a searched content is an image, the controller 140 may display the image in a full view form, a thumbnail image form, or a slideshow form. The controller 140 may display a list including a title of the image, etc.

If the searched content is a moving picture or music, the controller 140 may play a whole part or some of the moving picture or the music and display the moving picture as a thumbnail image or may sequentially display the music according to an album cover. The controller 140 may display a list including a title, a played time, a thumbnail image, an album cover, etc., of the moving picture or the music.

The controller 140 may generate a plurality of questions for searching for contents and a plurality of options selectable as answers to the questions and output the plurality of questions and the plurality of options through the display unit 110.

In this case, the display unit 110 may output first and second questions for searching for contents, and the controller 140 may control the display unit 110 to output a plurality of options selectable as answers to the first and second questions. The controller 140 may acquire a first criterion for searching for contents based on a first user answer to the first question, acquire a second criterion for searching for the contents based on a second user answer to the second question, and control the display unit to 110 to output search results searched according to the first and second criterions.

For example, the controller 140 may search for contents corresponding to the first criterion and, if the number of contents corresponding to the first criterion is greater than or equal to a preset number, generate a second question based on the first search result. Here, the preset number may be set and changed by the user.

If the number of contents searched based on an answer selected by the user from among answers to an output question is greater than or equal to the preset number, the controller 140 may generate an additional question for searching for contents and output the additional question through the display unit 110.

In this case, the controller 140 may check a sorting criterion for sorting contents corresponding to the first criterion based on metadata of each content corresponding to the first criterion and generate a second question based on the number of sorting groups sortable according to each sorting criterion. In detail, the controller 140 may generate a question about a sorting criterion in which the number of sortable sorting groups is greatest as a second question.

In the above-described exemplary embodiment, if "afternoon" is selected as an answer to the question "At what time was the content generated?", the first, third, fourth, fifth, and eighth contents that are generated in an afternoon time zone are searched. Here, if the preset number is set to 5 or less, the controller 150 determines a sorting criterion in which the number of sorting groups is greatest when sorting the first, third, fourth, fifth, and eighth contents, with reference to the attribute table information.

In detail, referring to Table 1, the first, third, fourth, fifth, and eighth contents may be sorted into contents that are generated in the area A, according to a content generated location as the sorting criterion. Therefore, when sorting the first, third, fourth, fifth, and eighth contents according to a content generated location, the controller 140 may determine a sortable sorting group as an A area group and calculate the number of sorting groups as 1.

Also, referring to Table 1, the first, third, fourth, fifth, and eighth contents may be sorted into contents that are played by devices A and B, according to content playing devices. Therefore, when sorting the first, third, fourth, fifth, and eighth contents according to the content playing devices as the sorting criterion, the controller 140 may determine sortable sorting groups as an A device group and a B device group and calculate the number of sorting groups as 2.

If the first, third, fourth, fifth, and eighth contents generated in the afternoon time zone are sorted based on content playing devices, the number of sorting groups is greatest. Therefore, the controller 140 may generate a question for inquiring a content playing device (for example, "Which device last played the content?) as a second question and output a UI screen including the second question through the display unit 110.

In this case, the controller 140 may control the display unit 110 to output a plurality of options selectable as answers to the second question. In other words, the controller 140 may generate a plurality of selectable answers to the second question, provide a UI screen including the second question and the plurality of selectable answers, and display the UI screen through the display unit 110.

In detail, when sorting contents searched based on the acquired first criterion, the controller 140 may select a plurality of selectable answers including titles of sorting groups sorted according to a sorting criterion in which the number of sorting groups is greatest.

In the above-described exemplary embodiment, a sorting criterion, in which the number of sorting groups is greatest when sorting the first, third, fourth, fifth, and eighth contents generated in the afternoon time zone, is a content playing device. Therefore, the controller 140 may generate titles "the device A" and "the device B" of sorting groups sorted according to the content playing device, as a plurality of selectable answers to the second question, provide a UI screen including a question "Which device last played the content?" and selectable answers "the device A" and "the device B" to the question, and display the UI screen through the display unit 110.

In the above-described exemplary embodiment, a second question and a plurality of options selectable as answers to the second question are displayed through one UI screen, but this is only an example. In other words, the controller 140 may provide additional UI screens respectively including a second question and a plurality of options selectable as answers to the second question and sequentially display the additional UI screens through the display unit 110.

Therefore, if one of the plurality of options selectable as the answers to the second question is selected, the controller 140 may determine the selected option as a second criterion and search for contents corresponding to the second criterion among a plurality of contents corresponding to the first criterion.

In the above-described exemplary, the user may select "the device B" as an answer to the question "Which device last played the content?" In this case, the controller 140 may determine the contents corresponding to the first criterion, i.e., the contents generated in the afternoon time zone, as the third, fourth, and fifth contents generated by the device B among the first, third, fourth, fifth, and eighth contents and output the third, fourth, and fifth contents through the display unit 110.

In this case, the controller 140 may play the contents searched according to the second criterion or display a list of contents searched according to the second criterion through the display unit 110. Here, the list of contents may include titles, generated times, played times, thumbnail images, etc., of the contents. In detail, the controller 140 may display the contents searched according to the second criterion by using the same method as the contents searched according to the first criterion, and thus a repeated description is omitted herein.

In the above-described exemplary embodiment, the second question is generated based on the contents searched according to the first criterion, but this is only an example. In other words, the controller 140 may generate the second question by using a sorting criterion in which the number of sorting groups is the second greatest as compared to the number of sorting groups sorted according to the sorting criterion that has been used to generate the first question. For example, as shown in Table 1, a sorting criterion, in which the number of sorting groups is the second greatest number of sorting groups as compared to the number of sorting groups according to the content generated time, may be a content generated location. Therefore, the controller 140 may generate a question (for example, "Where was the content generated?") for inquiring a content generated location as the second question.

In this case, the controller 140 may generate a plurality of selectable answers including titles (i.e., labels) of sorting groups sorted according to a sorting criterion in which the number of sorting groups is second greatest, with reference to the attribute information table. For example, as shown in Table 1, when sorting contents based on the content generated location, the number of sorting groups is second greatest. Therefore, the controller 140 may generate titles "the area A", "the area B", and "the area C" of sorting groups sorted according to the content generated location, as a plurality of selectable answers to the second question.

In this case, the controller 140 may output the first question, the plurality of options selectable as answers to the first question, the second question, and the plurality of options selectable as answers to the second question through one UI screen. In other words, the controller 140 may control the display unit 110 to output a UI screen including the first question, a plurality of selectable answers to the first question, the second question, and a plurality of selectable answers to the second question. In the above-described exemplary embodiment, a UI screen, including a question "At what time was the content generated?", answers "dawn", "morning", "afternoon", and "evening" to the question, a question "Where was the content generated" and answers "the area A", "the area B", and "the area C," to the question, may be output through the display unit 110.

The controller 140 may acquire first and second criterions based on user answers to questions and control the display unit 110 to output contents that correspond to the first and second criterions and are acquired from a plurality of contents. In the above-described exemplary embodiment, the user may select "evening" as an answer to a question "What time was the content generated?" and "the area C" as an answer to a question "Where was the content generated?" In this case, the controller 140 may determine contents generated in the area C among contents generated in the afternoon time zone among a plurality of contents, as the sixth content and output the sixth content through the display unit 110.

A question generated based on metadata about a content may be a question to an event that the user does not clearly remember. Therefore, the controller 140 may add an option (for example, "no memory" or "skip") for skipping a corresponding question to a plurality of options selectable as answers to each question.

Here, if the user selects the option for skipping the corresponding question, the controller 140 may generate a question about a sorting criterion, in which the number of sorting groups is the second greatest, i.e., the second highest number of sorting groups after the number of sorting groups according to a sorting criterion used to generate a skipped question, and a plurality of options selectable as answers to the question, based on the number of sorting groups and output the question and the plurality of options through the display unit 110. Here, the controller 140 may add an option for skipping a corresponding question.

For example, as shown in Table 1, the controller 140 may generate a question "At what time was the content generated?" for inquiring a content generated time in which the number of sorting groups is greatest and "dawn", "morning", "afternoon", and "evening" as selectable answers to the question and display a UI screen including the question and the selectable answers through the display unit 110. In this case, if the user selects "no memory" as an answer to the question "At what time was the content generated?", the controller 140 may not search for an additional content but generate a question "Where was the content generated?" for inquiring a sorting criterion in which the number of sorting groups is the second greatest, i.e., a content generated location in which the number of sorting groups is the second greatest, and "the area A", "the area B", "the area C", and "no memory" as a plurality of selectable answers to the question and display a UI screen including the question and the plurality of selectable answers on the display unit 110.

When a plurality of options selectable as answers to each question are output through the display unit 110, the controller 140 may control to output only the preset number of options.

In detail, the controller 140 may determine the numbers of contents included each sorting group sorted according to a sorting criterion and generate answers to a question, wherein the answers include the preset number of sorting groups to a question in order of the numbers of contents included in the sorting groups.

For example, as shown in Table 1, when contents are sorted based on a content generated time in which the number of sorting groups is greatest, the sorting groups may be sorted into dawn, morning, afternoon, and evening time groups. Also, the dawn time group may include one content (i.e., the tenth content), the morning time group may include one content (i.e., the second content), the afternoon time group may include five contents (i.e., the first, second, third, fourth, fifth, and eighth contents), and the evening time group may include two contents (i.e., the sixth and ninth contents).

Here, if two answers are set to be output, the controller 140 may generate selectable answers to a content generated time so that the selectable answers include only titles of two sorting groups which have the largest number of contents among a plurality of sorting groups, i.e., titles of the afternoon time group and the evening time group. Therefore, the controller 140 may constitute a UI screen including a question "At what time was the content generated?" and answers "afternoon" and "evening" to the question and display the UI screen through the display unit 110.

Furthermore, the controller 140 may add a sorting group, which is sorted according to a sorting criterion but is not output as a selectable answer to a question, to a selectable answer. In the above-described exemplary embodiment, the controller 140 may output "afternoon", "evening", and "others" through the display unit 110 and, if "others" is selected, search for contents generated in the dawn and morning time zones.

If there are sorting criteria in which the numbers of sorting groups are the same when sorting contents according to sorting criteria, the controller 140 may generate a question for inquiring a sorting criterion having the highest priority according to preset priorities. Here, the priorities may be set and changed by the user.

For example, the number of sorting groups when sorting a plurality of contents by using a content type as a sorting criterion may be equal to the number of sorting groups when sorting a plurality of contents using a content generated date as a sorting criterion. Here, the controller 140 may generate a UI screen including a question for inquiring a content type, the content type being a sorting criterion with a higher priority than the content generated date, and a selectable answer to the question and display the UI screen through the display unit 110.

In the above-described exemplary embodiment, the controller 140 may generate an additional question besides the second question and display the additional question through the display unit 110. In other words, if the number of contents searched according to the second criterion acquired through the second question is greater than or equal to the preset number, the controller 140 may continuously generate additional questions, such as a third question, a fourth question, etc., until the number of searched contents is less than the preset number, and a plurality of options selectable as answers to the additional questions and output the additional questions and the plurality of options through the display unit 110. Even in this case, the controller 140 may generate a question for inquiring a sorting criterion in which the number of sorting groups is greatest when sorting contents searched according to a criterion acquired as an answer to each question. Therefore, the controller 140 may generate a plurality of selectable answers to each question so that the plurality of selectable answers include titles of sorting groups sorted according to the question.

Also, in the above-described exemplary embodiment, one of a plurality of options selectable as answers to each question is selected, and the selected option is set to a criterion. However, this is only an example, and it is understood that one or more other exemplary embodiments are not limited thereto. For example, according to another exemplary embodiment, the user may select two or more options. In this case, the controller 140 may set the selected two or more options to criterions for searching for contents, search for contents according to the set criterions, and output the searched contents through the display unit 110. Also, the controller 140 may generate an additional question and an answer to the additional question according to whether the number of contents searched based on the selected two or more options is less than the preset number and output the additional question and the answer through the display unit 110.

In the above-described exemplary embodiment, if the number of contents searched according to the first criterion is greater than or equal to the preset number, the controller 140 generates and displays an additional second question, but this is only an example and it is understood that one or more other exemplary embodiments are not limited thereto. For example, according to another exemplary embodiment, although the number of contents searched according to the first criterion is less than the preset number, the controller 140 may generate an additional second question until an additional search stop command is input and display the additional second question through the display unit 110.

In the above-described exemplary embodiment, the attribute information table is stored in the storage unit 130, but this is only an example and it is understood that one or more other exemplary embodiments are not limited thereto. For example, the attribute information table is not stored according to another exemplary embodiment, and the controller 140 may extract metadata from contents stored in the storage unit 130, check sorting criterions for sorting a plurality of contents based on each metadata, and generate a question and an answer to the question based on the number of sorting groups sortable according to each sorting criterion.

Also, in the above-described exemplary embodiment, a question for inquiring a sorting criterion in which the number of sorting groups is greatest is generated, but this is only an example and it is understood that one or more other exemplary embodiments are not limited thereto. For example, according to another exemplary embodiment, the controller 140 may generate a question for inquiring a sorting criterion in which the number of sorting groups is least and an answer to the question and output the question and the answer through the display unit 110. Here, the answer includes titles of sorting groups sorted according to the corresponding sorting criterion.

In addition, in the above-described exemplary embodiment, contents stored in the storage unit 130 are searched, but this is only an example and it is understood that one or more other exemplary embodiments are not limited thereto. For example, if the device 100 includes a communication module (e.g., communicator) that may communicate with an external server (for example, a cloud server or a Social Networking Service (SNS) server), the controller 140 may generate and output a question for searching for contents stored in the external server and an answer to the question to search for the contents stored in the external server according to another exemplary embodiment.

In detail, the controller 140 may control the communication module to request transmissions of metadata about the contents stored in the external server and receive the metadata about each content from the external server. Therefore, the controller 140 may generate an attribute information table by using various types of information included in the metadata about each content stored in the external server and store the attribute information table in the storage unit 130. Alternatively, the controller 140 may control the communication module to receive an attribute information table from the external server and a content management device. The controller 140 may also generate and output each question and a selectable answer to the question by using the attribute information table of the external server, search for contents based on an answer selected by the user, and output a search result through the display unit 110.

The controller 140 may control the display unit 110 to display a UI screen for searching for contents. If a search word is input through the UI screen for searching for the contents, the controller 140 may extract contents corresponding to the search word and generate a first question based on the extracted contents.

Here, the search word may include various types of keywords related to contents. For example, the search word may include a title, a generated date, a generated time, and a generated location of a content, a person included in the content, a place included in the content, a genre, a type, and a maker of the content, etc.

In general, the user may remember keywords related to a content that the user wants to search for. For example, if the user wants to search for an image that has been captured 5 years ago in the area A, the user may remember a type, a generated date, and a generated location of the image. Therefore, if a search word is input through a UI screen for searching for contents, the controller 140 extracts contents corresponding to the input search word from a plurality of contents stored in the storage unit 130.

However, the user may not accurately search for a desired content through only a search word that the user remembers, without a second thought. Therefore, the controller 140 checks a sorting criterion for sorting contents extracted based on metadata of each content extracted according to a search word, generates a first question based on the number of sorting groups sortable according to each sorting criterion, and outputs the first question through the display unit 110. Also, the controller 140 generates a plurality of options selectable as answers to the first question and outputs the plurality of options trough the display unit 110.

This will be described in more detail with reference to Table 2 below.

For example, an attribute information table generated based on 10 contents stored in the storage unit 130 is shown in Table 2 below.

TABLE 2

| | Content Generated Location | | Content Generated Time | | | Content Generated Device | |
|---|---|---|---|---|---|---|---|
| | A Area | B Area | Morning (6~12) | Afternoon (12~18) | Evening (18~24) | A Device | B Device |
| Content 1 | ∨ | | | ∨ | | ∨ | |
| Content 2 | ∨ | | | ∨ | | ∨ | |
| Content 3 | | ∨ | | | ∨ | ∨ | |
| Content 4 | | ∨ | | | ∨ | | ∨ |
| Content 5 | | ∨ | | | ∨ | ∨ | |
| Content 6 | ∨ | | ∨ | | | | ∨ |
| Content 7 | | ∨ | | | ∨ | ∨ | |
| Content 8 | | ∨ | | | ∨ | ∨ | |
| Content 9 | ∨ | | ∨ | | | | ∨ |
| Content 10 | | ∨ | | | ∨ | ∨ | |

If "area B" is input as a search word related to a content generated location from the user, the controller 140 extracts contents generated in the area B from contents stored in the storage unit 130 based on the attribute information table. For example, as shown in Table 2, the controller 140 extracts third, fourth, fifth, seventh, eighth, and tenth contents from contents stored in the storage unit 130.

The controller 140 checks a sorting criterion for sorting contents based on metadata of extracted contents into a plurality of contents and generates a question to a sorting criterion in which the number of sorting groups is greatest when sorting the extracted contents according to the sorting criterion, as a first question. In the above-described exemplary embodiment, sorting criterions for sorting the third, fourth, fifth, seventh, eighth, and tenth contents may be a content generated time and a content generating device. Also, since the number of sorting groups is greatest when sorting contents based on a content generating device, the controller 140 may generate a question "Which device generated the content?" for inquiring the content generating device as the first question and display a UI screen including the first question through the display unit 110.

In this case, the controller 140 may control the display unit 110 to output a plurality of options selectable as answers to the first question. In other words, the controller 140 may generate a plurality of selectable answers to the first question, constitute a UI screen including the first question and the plurality of selectable answers, and output the UI screen through the display unit 110. In the above-described exemplary embodiment, the controller 140 may generate "the device A" and "the device B", which are titles of sorting groups sorted according to the content generating device, as a plurality of selectable answers to the first question, constitute a UI screen including a question "Which device generated the content?" and answers "the device A" and "the device B" to the question, and output the UI screen through the display unit 110. In this case, the controller 140 may additionally generate "no memory," which is an answer for skipping the corresponding question.

The controller 140 may acquire a first criterion for searching for contents based on a user answer to the first question and control the display unit 110 to output a first search result searched based on the first criterion. In the above-described exemplary embodiment, the user may select "the device B" as an answer to the question "Which device generated the content?" In this case, the controller 140 may determine a content generated by the device B as the fourth content with reference to the attribute information table and output the fourth content through the display unit 110.

In the above-described exemplary embodiment, one question and a plurality of options selectable as answers to the question are output to search for contents, but this is only an example and it is understood that one or more other exemplary embodiments are not limited thereto. For example, according to another exemplary embodiment, the controller 140 may output an additional question and a plurality of options selectable as answers to the additional question until the number of searched contents is less than or equal to a preset number.

In the above-described exemplary embodiment, a search word is input, and a question and a selectable answer to the question are generated based on contents extracted based on the search word, but this is only an example and it is understood that one or more other exemplary embodiments are not limited thereto. For example, according to another exemplary embodiment, a UI screen including a question and selectable answers to the question that are generated based on metadata may be displayed, and then a search word for searching for contents may be input.

In detail, if a UI screen including a question for searching for contents and a plurality of options selectable as answers to the question is displayed, and one option is selected by the user, the controller 140 may use the selected option as a criterion for searching for contents to search for contents corresponding to the criterion. If a user command for inputting a search word is input, the controller 140 may display a UI screen for inputting the search word on the display unit 110. Therefore, if the search word is input onto the UI screen for inputting the search word, the controller 140 may search for contents corresponding to the input search word among contents searched based on the selected option and output the searched contents through the display unit 110.

In an example as shown in Table 2, a UI screen, including a question "At what time was the content generated?" for inquiring a content generated time in which the number of sorting groups is greatest and answers "morning", "afternoon", and "evening" to the question, may be displayed. In this case, if the user selects the answer "evening", the controller 140 may search for the third, fourth, fifth, seventh, eighth, and tenth contents that are contents generated in the evening time zone and display the third, fourth, fifth, seventh, eighth, and tenth contents through the display unit 110.

The controller 140 displays a UI screen for inputting a search word based on a user control. If "the device A" is input as a search word related to a content generating device on the UI screen, the controller 140 may search for the third, fifth, seventh, eighth, and tenth contents, which are generated by the device A, among the third, fourth, fifth, seventh, eighth, and tenth contents and display the third, fifth, seventh, eighth, and tenth contents through the display unit 110.

In the above-described exemplary embodiments, the controller 140 generates an attribute information table based on metadata of all contents stored in the storage unit 130, but this is only an example and it is understood that one or more other exemplary embodiments are not limited thereto. For example, based on a user command, the controller 140 may generate the attribute information table based on only metadata of a content that is received from an external device or generated by the device 100 before a preset period based on a current time and store the attribute information table in the storage unit 130, according to one or more other exemplary embodiments. For this purpose, the device 100 may include a communication module (e.g., communicator) that communicates with the external device, and the external device may include other devices that communicate with an SNS server, a cloud server, and the device 100. For example, the controller 140 may generate the attribute information table based on metadata of a content that is received from the outside or generated by the device 100 within one week, within one month, or the like. However, this is only an example, and the controller 140 may generate the attribute information table within 3 months, within six months, etc.

Also, in the above-described exemplary embodiments, the controller 140 generates the attribute information table based on only the content generated location regardless of a current location of the device 100 and displays a UI screen including a question and an answer to the question based on the attribute information table, but this is only an example and it is understood that one or more other exemplary embodiments are not limited thereto. For example, according to another exemplary embodiment, the controller 140 may consider the current location of the device 100 to constitute a UI screen including a question for inquiring a content generated location and an answer to the question. For this purpose, the device 100 may include a GPS receiver that calculates the current position of the device 100.

In detail, the controller 140 may calculate the current location of the device 100 by using the GPS receiver when generating a UI screen including a question and an answer to the question by using a content generated location as a sorting criterion and generate a UI including only sorting groups generated within a preset distance from the calculated current position of the device 100. For example, the controller 140 may generate a question for inquiring a content generated location and an answer to the question based on the attribute information table of Table 1 above. Here, if only the areas A and B are located within the preset distance from the current location of the device 100, the controller 140 may output a UI screen including a question "Where was the content generated?" and answers "the area A" and "the area B" to the question through the display unit 110. In other words, an area C located out of the preset distance from the current location of the device 100 may not be included in the UI screen.

The controller 140 may control to generate an attribute information table based on metadata about all contents stored in the storage unit 130 and store information about the attribute information table in a cloud server. For this purpose, the device 100 may include a communication module (e.g., communicator) that communicates with the cloud server, and the controller 140 may transmit the information about the attribute information table to the cloud server through the communication module.

In this case, the controller 140 may generate a question for searching for contents and a selectable answer to the question based on the attribute information table stored in the storage unit 130 and output the question and the answer through the display unit 110. Thereafter, the controller 140 may generate a question for searching for contents and a selectable answer to the question based on the attribute information table stored in the cloud server and output the question and the answer through the display unit 110. Through this, the controller 140 may search for contents that have been recently received from the outside or have been generated in the device 100.

In detail, the controller 140 may generate a question for searching for contents and a selectable answer to the question based on the attribute information table stored in the storage unit 130 and display a UI screen including the question and the answer. The controller 140 may also search for and output contents corresponding to an answer selected by the user on the UI screen. Here, the controller 140 may display a graphical user interface (GUI) (for example, "Search for all contents") for searching contents based on all contents stored in the storage unit 130, on a search result screen.

Therefore, if the corresponding GUI is selected, the controller 140 controls the communication module to request a transmission of the attribute information table, which is generated based on all contents, from the cloud server. Therefore, the controller 140 displays a UI screen including a question for searching for contents and a selectable answer to the question based on the attribute information table received from the cloud server, and searches for and outputs contents corresponding to an answer selected by the user on the UI screen.

Figure 4:
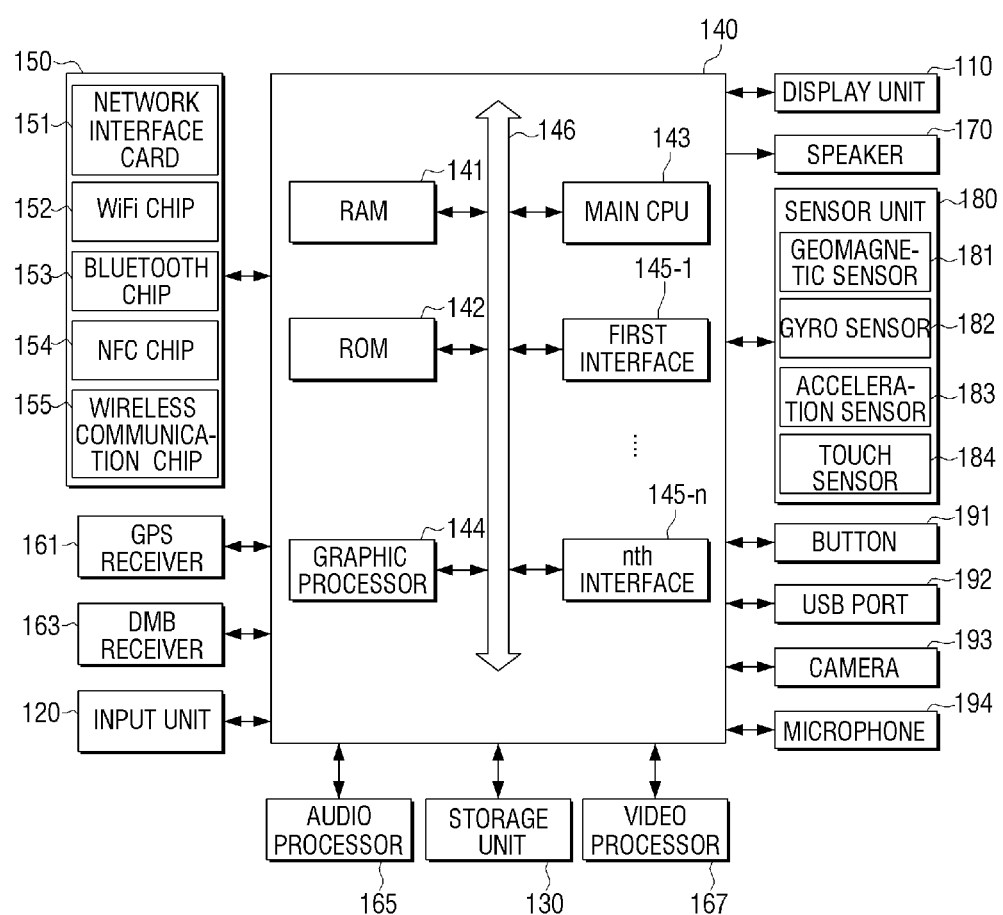
FIG. 4 is a block diagram illustrating a detailed structure of a device according to an exemplary embodiment.

FIG. 4 is a block diagram illustrating a detailed structure of a device 100, according to an exemplary embodiment. Referring to FIG. 4, the device 100 includes a communicator 150, a GPS receiver 161, a Digital Multimedia Broadcasting (DMB) receiver 163, an audio processor 165, a video processor 167, a speaker 170, a sensor unit 180 (e.g., sensor), a button 191, a universal serial bus (USB) port 192, a camera 193, and a microphone 194, besides the elements of FIG. 2.

The communicator 150 may communicate with various types of external devices. Here, the external devices may include an external server, such as an SNS server, a cloud server, or the like, and other devices that communicate with the device 100.

For this purpose, the communicator 150 includes at least one of a network interface card 151, a WiFi chip 152, a Bluetooth chip 153, or a near field communication (NFC) chip 154.

In detail, the network interface card 151 communicates with an external device through the Internet to transmit and receive various types of contents and various types of information.

A wireless communication chip 155 accesses a mobile communication network or the Internet according to various types of mobile communication standards, such as 3GPP, LTE, etc., to perform various types of wireless communications.

The WiFi chip 152 or the Bluetooth chip 153 transmits and/or receives various types of connection information, performs a communication connection by using the various types of connection information, and communicates with the external device through a network.

The NFC chip 154 operates according to an NFC method that uses 13.56 MHz among various types of Radio Frequency Identification (RFID) frequency bands such as 135 KHz, 13.56 MHz, 433 MHz, 860 MHz-960 MHz, 2.45 GHz, etc. If the NFC chip 154 is used, the external device may include an NFC reader. Therefore, if a user moves the device 100 or the external device within a communicable range (e.g., about 10 cm), contents recorded in the NFC chip 154 are transmitted to the external device. The communicator 150 may include an NFC reader and receive contents stored in an NFC chip installed in the external device through the NFC reader.

The controller 140 may control various types of communication modules constituting the communicator 150 to receive contents from the external device.

The controller 140 may control the communicator 150 to request a transmission of metadata about the contents stored in the external device and receive the metadata about the contents from the external device. In this case, the controller 140 may generate an attribute information table by using the metadata received from the external device, match the generated attribute information table with respective external devices, and store the attribute information table in the storage unit 130

The GPS receiver 161 receives a GPS signal from a GPS satellite to calculate a current location of the device 100. The controller 140 may determine an area in which the device 100 is currently located, by using calculated GPS information.

The DMB receiver 163 receives and processes a DMB signal.

The audio processor 165 processes audio data. The audio processor 165 may perform various types of processing, such as decoding, amplifying, noise-filtering, etc., with respect to the audio data.

The video processor 167 processes video data. The video processor 167 may perform various types of image processing, such as decoding, scaling, noise-filtering, a frame rate conversion, a resolution conversion, etc., with respect to the video data. In particular, a codec may be realized as software or hardware. The video processor 163 may include a codec that is realized as hardware and perform encoding or decoding with respect to the video data by using the codec.

The speaker 170 may output various types of audio data processed by the audio processor 165, various types of notification sounds, voice messages, etc.

The sensor unit 180 senses a control content of a user for the device 100, a status of the device 100, etc. The sensor unit 180 may include various types of sensors such as a geomagnetic sensor 181, a gyro sensor 182, an acceleration sensor 183, a touch sensor 184, etc.

The geomagnetic sensor 181 senses a surrounding geomagnetic change by using a biaxial or triaxial flux gate. The controller 140 may calculate an azimuth by using a geomagnetic value sensed by the geomagnetic sensor 181. Therefore, the controller 140 may determine a direction in which the device 100 has rotated.

The acceleration sensor 183 measures an acceleration when a motion occurs and a direction of the acceleration. In detail, the acceleration sensor 183 outputs a sensing value corresponding to an acceleration of gravity that changes according to a gradient of the device 100 to which the accelerations sensor 183 is attached. The controller 140 may determine an inclined degree of a moving body by using the output value of the acceleration sensor 183.

If a rotary motion occurs, the gyro sensor 182 measures the Coriolis force working in a speed direction of the rotary motion to sense an acceleration. The controller 140 may sense a rotation of the device 100 by using the measurement value of the gyro sensor 182.

The touch sensor 184 may be connected to the display unit 110 to sense a touch control of the user. The touch sensor 184 may be realized as a capacitive touch sensor or a resistive touch sensor.

The capacitive touch sensor senses micro electricity, which is excited into a body of the user when a part of the body of the user touches a surface of the display unit 110, by using a dielectric coated on the surface of the display unit 110 to calculate touch coordinates.

The resistive touch sensor includes two electrode plates installed in the display unit 110 to sense a current that flows if upper and lower plates of a touched point contact each other when the user touches a screen, in order to calculate touch coordinates. The sensor unit 180 senses coordinates of the point touched by the user through the touch sensor 184 and provides the coordinates to the controller 140.

The controller 140 may perform various control operations according to various types of sensing signals provided from the sensor unit 180.

For example, the controller 140 may determine a touched point of a UI screen including a question and a plurality of options selectable as answers to the question based on the sensing result of the touch sensor 184 and determine a selected option based on a coordinate value of the touched point. If a search window is touched on a UI screen for inputting a search word based on the sensing result of the touch sensor 184, the controller 140 may display a virtual keyboard on the display unit 110. The controller 140 may determine a search word that is input based on a coordinate value of a point on the virtual keyboard that is touched.

If the geomagnetic sensor 181, the gyro sensor 182, the acceleration sensor 183, or the like senses that the device 100 has rotated in a horizontal or vertical direction, the controller 140 may perform an operation of changing a screen according to a rotation direction. For example, the controller 140 may rotate a screen of a content displayed on the display unit 110 so that the rotation of the screen corresponds to a rotation of the device 100.

The device 100 further includes various types of elements, such as the button 191, the USB port 192, the camera 193, the microphone 194, etc. The button 191 may be various types of buttons such as a mechanical button, a touch pad, a wheel, a dial, etc., that are formed in an arbitrary area of a front side, a side, or a back side of an outer body of the device 100. The USB port 192 refers to a port to which a USB memory or a USB connector may be connected. The device 100 may search for contents stored in an external device connected to the device 100 through the USB port 192 and various types of connection ports and determine whether it is possible to share the contents.

The camera 913 captures a subject. For example, if the user captures various types of objects through the camera 193, the controller 140 may control the storage unit 130 to store an image or a moving picture captured by the camera 193.

If the camera 193 and the microphone 194 are provided, the controller 140 may perform a control operation according to a user voice input through the microphone 194 or a user motion recognized by the camera 193.

In other words, the device 100 may operate in a motion control mode or a voice control mode.

If the device 100 operates in the motion control mode, the controller 140 may activate the camera 193 to capture the user and track a motion change of the user to perform a control operation corresponding to the motion change of the user. For example, the controller 140 may highlight and display one option on a UI screen including a question and a plurality of options selectable as answers to the question, and move the highlight according to a motion of the user (for example, a motion of a user moving a hand from the left side to the right side or a motion of the user moving the hand from the right side to the left side) to input a user command for selecting one option. The controller 140 may search for contents corresponding to an answer selected by the motion of the user. The controller 140 may determine a search word input on a virtual keyboard based on the user motion and extract contents corresponding to the search word.

Alternatively, the controller 140 may control the speaker 170 to output a voice corresponding to a question and a plurality of options selectable as answers to the question through the speaker 170 and control the microphone 194 to output a user voice corresponding to the output voice. In this case, the controller 140 may analyze the user voice input through the microphone 194 to determine an option that the user wants to select and search for contents corresponding to the selected option. The controller 140 may analyze the user voice input through the microphone 194 to determine a search word included in the user voice and extract contents corresponding to the search word.

The above-described operation of the controller 140 may be performed by, or in accordance with, a program stored in the storage unit 130.

In other words, the storage unit 130 may store operating system (OS) software and an application for operating the device 100, various types of data input or set when executing the application, and various types of data such as contents, etc. In particular, the storage unit 130 may store an application for searching for contents. If the corresponding application is executed according to a user control, the controller 140 may control to output a UI screen including a question for searching for contents and a selectable answer to the question in order to search for contents desired by the user.

The controller 140 controls an overall operation of the device 100 by using various types of programs stored in the storage unit 130.

In detail, the controller 140 includes a random access memory (RAM) 141, a read only memory (ROM) 142, a main central processing unit (CPU) 143, a graphic processor 144, first through $n^{th}$ interfaces 145-1 through 145-N, and a bus 146.

The RAM 141, the ROM 142, the main CPU 143, the graphic processor 144, and the first through $n^{th}$ interfaces 145-1 through 145-n are connected to one another through the bus 146 to transmit and/or receive various types of data or signals.

The first through nth interfaces 145-1 through 145-n may be connected to various types of elements of FIG. 4 and other elements so that the main CPU 143 accesses the elements of FIG. 4 and the other elements.

The main CPU 143 accesses the storage unit 130 to perform booting by using the OS stored in the storage unit 130. The main CPU 143 performs various operations by using various types of programs, contents, data, etc., stored in the storage unit 130.

In detail, the ROM 142 stores a command set, etc., for booting a system. If a turn-on command is input to supply power, the main CPU 143 copies the OS stored in the storage unit 130 into the RAM 141 according to a command stored in the ROM 142 and executes the OS to boot the system. If the system is completely booted, the main CPU 143 copies various types of application programs stored in the storage unit 130 into the RAM 141 and executes the application programs copied into the RAM 141 to perform various operations.

The graphic processor 144 constitutes various types of screens under control of the main CPU 143. The graphic processor 144 calculates a display status value of a screen. The display status value may be a coordinate value of a position in which an object is to be displayed on the screen, an attribute value indicating a shape, a size, a color, etc., of the object, or the like. If the display status value is calculated, the graphic processor 144 performs rendering based on the display status value to generate a screen.

If it is determined that the user has input a content search command through the sensor unit 180 or the button 191, the main CPU 143 controls the graphic processor 144 to generate various types of UI screens and searches for contents stored in the storage unit 130 based on a user control performed on the UI screen.

As described above, the controller 140 may copy a program stored in the storage unit 130 into the RAM 141 and execute the copied program to perform various operations.

Figure 5:
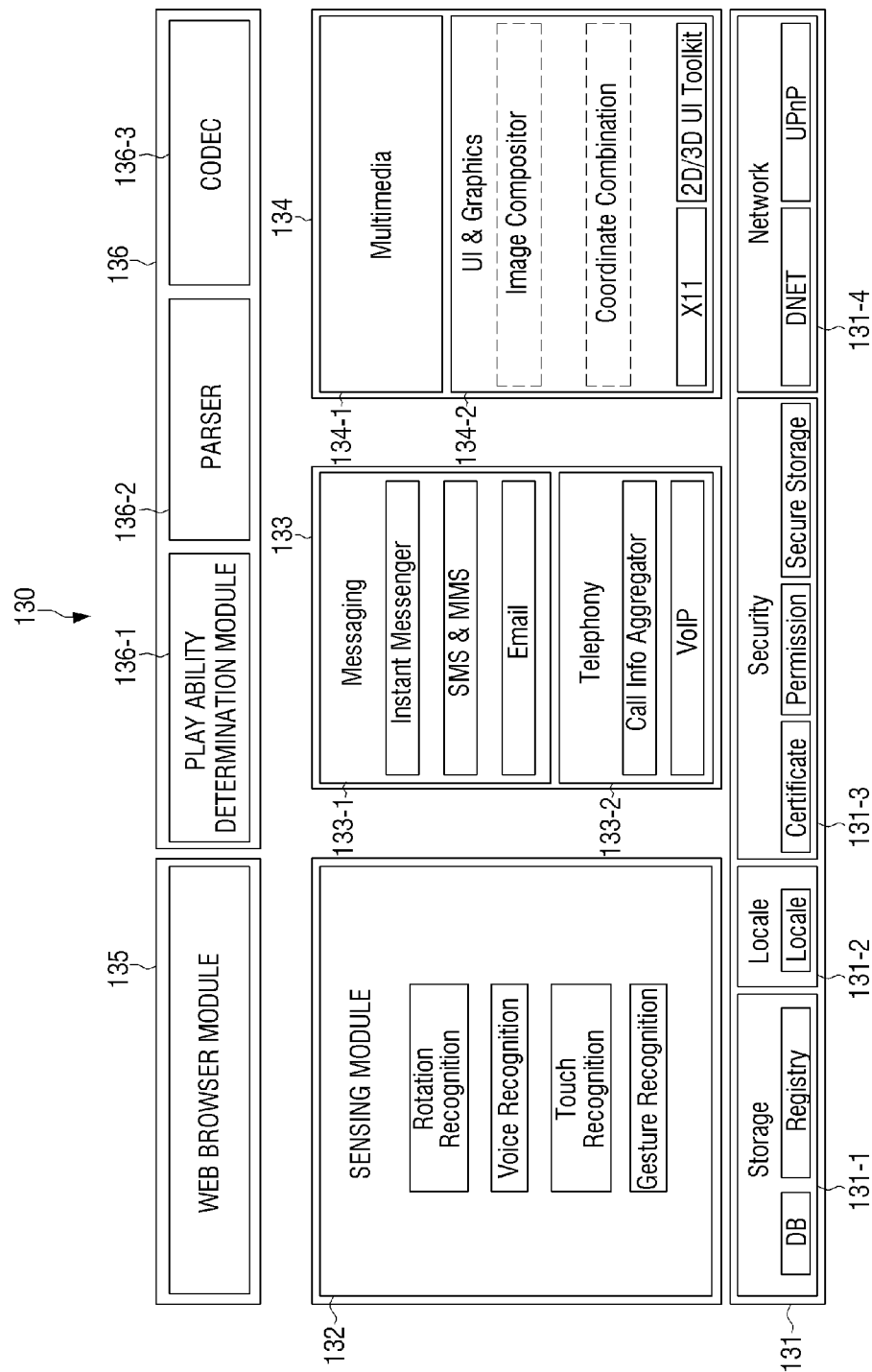
FIG. 5 is a block diagram illustrating a hierarchy of software stored in a storage unit according to an exemplary embodiment.

FIG. 5 is a view illustrating layers of software stored in the storage unit 130, according to an exemplary embodiment. Referring to FIG. 5, the storage unit 130 includes a base module 131, a sensing module 132, a communication module 133, a presentation module 134, a web browser module 135, and a content processing module 136.

The base module 131 processes a signal transmitted from each piece of hardware of the device 100 and transmits the processed signal to an upper layer module.

The base module 131 includes a storage module 131-1, a location-based module 131-2, a security module 131-3, and a network module 131-4.

The storage module 131-1 is a program module that manages a database (DB) or a registry. The main CPU 133 may access the DB of the storage unit 130 by using the storage module 131-1 to read various types of data. The location-based module 131-2 is a program module that operates along with various types of hardware such as a GPS chip, etc. to support a location-based service. The security module 131-3 is a program module that supports a certification, a permission, a secure storage, etc., of hardware. The network module 131-4 is a module that supports a network connection and includes a DNET module, a Universal Plug and Play (UPnP) module, etc.

The sensing module 132 manages and uses information about an external input and an external device. The sensing module 132 includes a rotation recognition module, a voice recognition module, a touch recognition module, and a gesture recognition module. The rotation recognition module is a program that calculates a rotation angle and a rotation direction by using a sensing value sensed by a sensor such as the geomagnetic sensor 181, the gyro sensor 182, or the like. The voice recognition module is a program that analyzes voice signals collected from the microphone 194 to extract a voice of a user. The touch recognition module is a program that detects a touch coordinate by using the sensing value sensed by the touch sensor 184. The gesture recognition module is a program that analyzes an image captured by the camera 193 to recognize a gesture of the user.

The communication module 133 performs a communication with an external device. The communication module 133 may include a messaging module 133-1 such as a messenger program, a Short Message Service (SMS) & Multimedia Message Service (MMS) program, an e-mail program, etc., and a call module 133-2 including a call info aggregator program module, a Voice over Internet Protocol (VoIP) module, etc.

The presentation module 134 constitutes a display screen. The presentation module 134 includes a multimedia module 134-1 that plays and outputs a multimedia content and a UI & graphic module 134-2 that performs UI and graphic-processing. The multimedia module 134-1 may include a player module, a camcorder module, a sound processing module, etc. Therefore, the multimedia module 134-1 plays various types of multimedia contents to generate a screen and a sound in order to perform a play operation. The UI & graphic module 134-2 may include an image compositor module that composes an image, a coordinate combination module that combines and generates coordinates on a screen to display an image, an X11 module that receives various types of events from hardware, and a 2-dimensional (2D)/3-dimensional (3D) UI toolkit that provides a tool for constituting a 2D or 3D type UI.

The web browser module 135 performs web browsing to access a web server. The web browser module 135 may include various types of modules such as a web view module that constitutes a webpage, a download agent module that performs downloading, a bookmark module, a Webkit module, etc.

The content processing module 136 refers to software for processing contents stored in the storage unit 130. A play ability determination module 136-1 is a program that operates through an algorithm comparing play ability information and content attributes. A parser and a codec 136-3 are software provided to the video processor 167 to process contents. The parser 136-2 may be realized as only software, and the codec 136-3 may be realized as software or hardware.

Various types of application modules, such as a navigation service module, a game module, etc., may be further included.

Some of various types of program modules shown in FIG. 5 may be omitted, changed or added according to a type and a characteristic of the device 100. For example, if the device 100 is a smart phone, an e-book device, a game application, and other utility programs may be further included. Also, some of program modules of FIG. 5 may be omitted.

Some of the elements of FIG. 4 may be omitted, changed, or added according to the type and the characteristic of the device 100. For example, if the device 100 is a TV, hardware such as an antenna or a tuner may be further included.

FIGS. 6 through 21 are views illustrating a method of searching for contents according to an exemplary embodiment. The present drawings assume that an attribute information table stored in the device 100 will be as shown in Table 3.

TABLE 3

| | Content Generated Location | | Content Generated Time | | | | Content Generating Device | | |
|---|---|---|---|---|---|---|---|---|---|
| | | | Dawn | Morning | Afternoon | Evening | | | |
| | A Area | B Area | (0~6) | (6~12) | (12~18) | (18~24) | A Device | B Device | C Device |
| Content 1 | √ | | | √ | | | | | √ |
| Content 2 | √ | | | | √ | | √ | | |
| Content 3 | | √ | | | √ | | √ | | |
| Content 4 | | √ | | | | √ | | | √ |

TABLE 3-continued

| | Content Generated Location | | Content Generated Time | | | | Content Generating Device | | |
|---|---|---|---|---|---|---|---|---|---|
| | A Area | B Area | Dawn (0~6) | Morning (6~12) | Afternoon (12~18) | Evening (18~24) | A Device | B Device | C Device |
| Content 5 | | ∨ | | ∨ | | | | ∨ | |
| Content 6 | ∨ | | | | | ∨ | ∨ | | |
| Content 7 | | ∨ | | | | ∨ | | ∨ | |
| Content 8 | | ∨ | | | | ∨ | | | ∨ |
| Content 9 | ∨ | | | ∨ | | | | | ∨ |
| Content 10 | | ∨ | | | ∨ | | | ∨ | |

Figure 6:
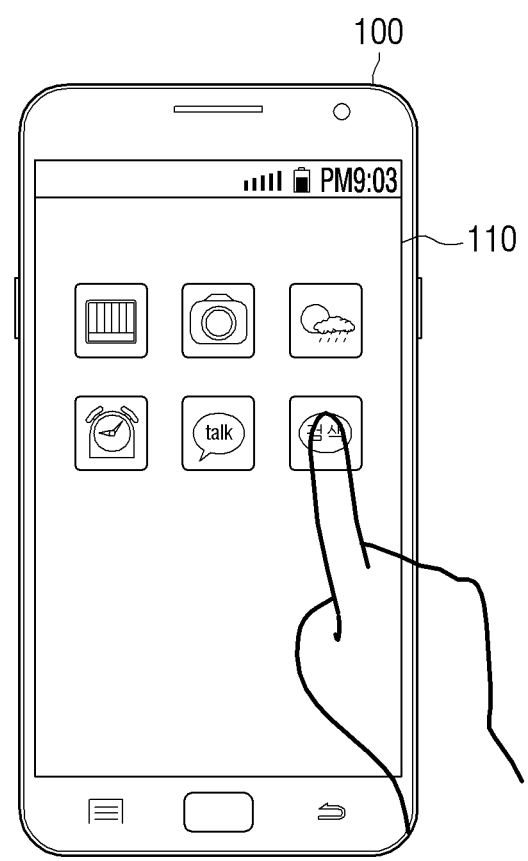
FIGS. 6 through 21 are views illustrating a method of searching for contents according to an exemplary embodiment.

As shown in FIG. 6, if one of a plurality of icons for searching for contents is touched by the user, the controller 140 determines that a user command for searching for contents has been input and executes an application for searching for contents. Here, the plurality of icons are displayed on a home screen of the device 100. In other words, an application stored in the device 100 may be provided in an icon interface form on a screen of the device 100, and the user may select an icon displayed on the screen to execute the application.

Figure 7:
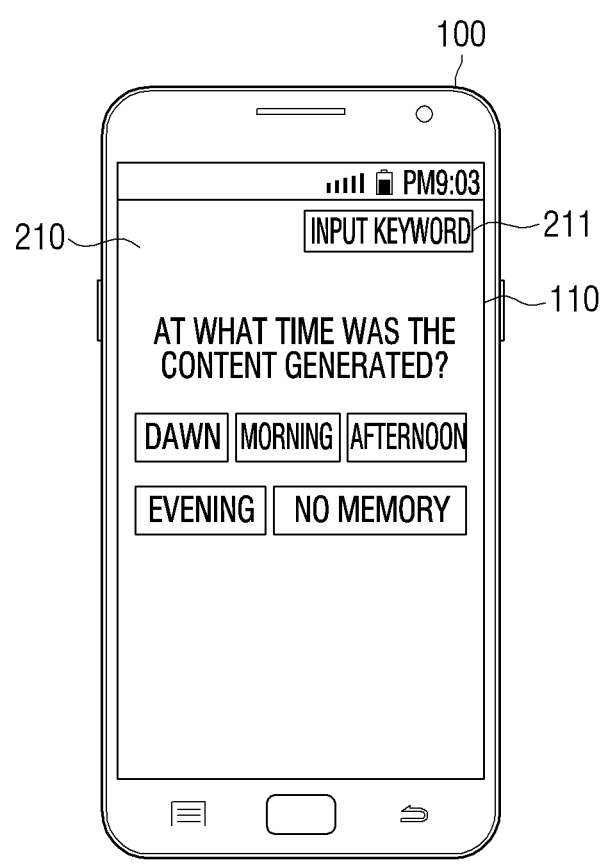

In this case, the controller 140 may determine that the number of sorting groups is greatest when sorting contents according to a content generated time, with reference to an attribute information table as shown in Table 3, and display a UI screen 210 including a question "At what time was the content generated?" and answers "dawn", "morning", "afternoon", "evening", and "no memory" to the question through the display unit 110 as shown in FIG. 7.

If "dawn" is selected on the UI screen 210, the controller 140 determines that a content generated in a dawn time range is a first content, with reference to an attribute information table as shown in Table 3. Here, if a searched content is set to be equal to or lower than 1 in a preset condition for outputting a searched result, the controller 140 may output the first content through the display unit 110 as shown in FIG. 8.

Figure 8:
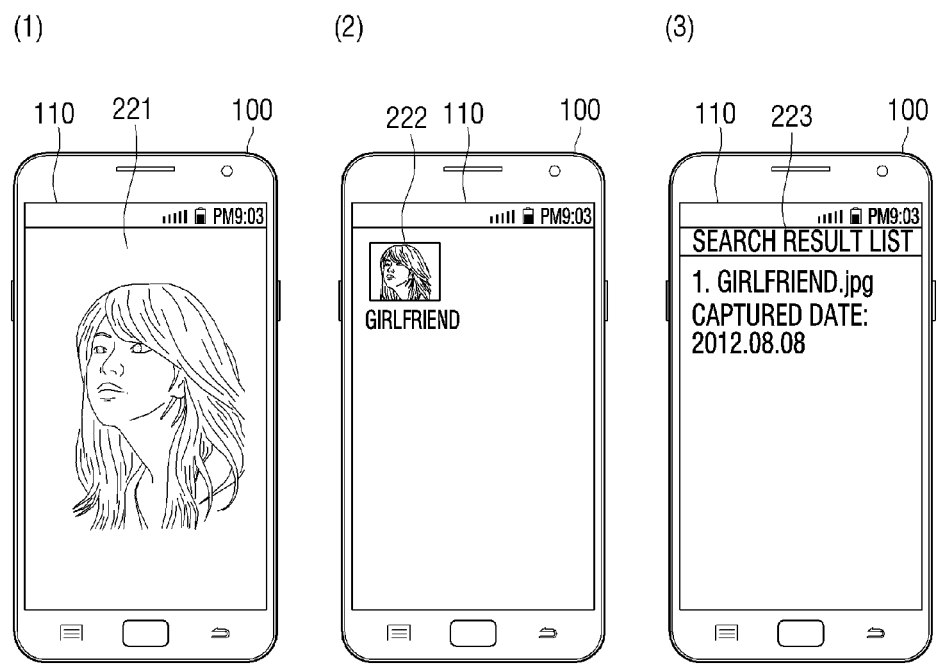

For example, if the searched first content is an image, a searched first image may be output in a full view form 221 as shown in (1) of FIG. 8 or a thumbnail image 222 of the searched first image may be output along with a title through the display unit 110 as shown in (2) of FIG. 8. A list 223 including the title, a generated date, etc., of the searched first image may be displayed as shown in (3) of FIG. 8.

Figure 9:
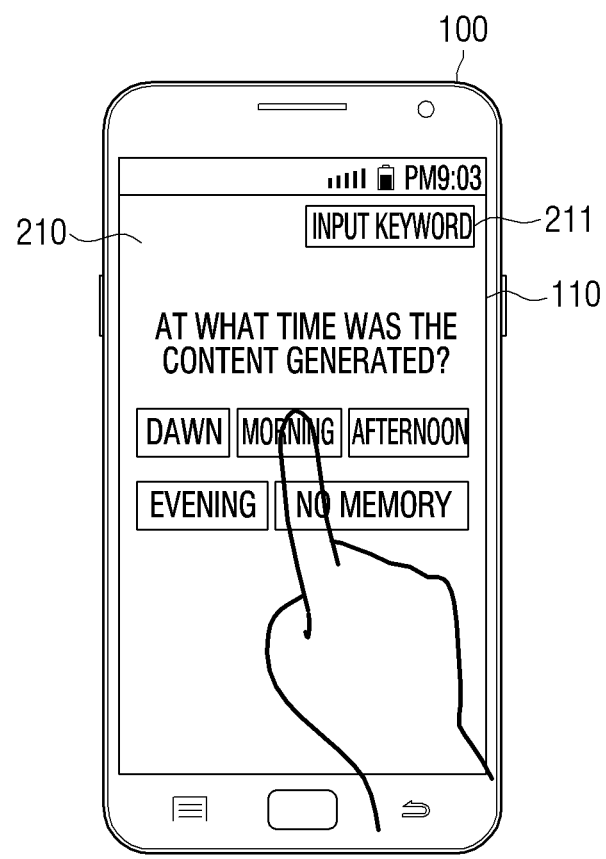

If "morning" is selected on a UI screen 210 as shown in FIG. 9, the controller 140 determines that contents generated in a morning time range are second, third, fifth, and ninth contents, with reference to the attribute information table as shown in Table 3. In this case, since the number of searched contents is four, the four searched contents do not match with a preset condition for outputting a search result. Therefore, the controller 140 generates an additional question for searching for contents and selectable answers to the additional question based on the search result and outputs the additional question and the selectable answers through the display unit 110.

Figure 10:
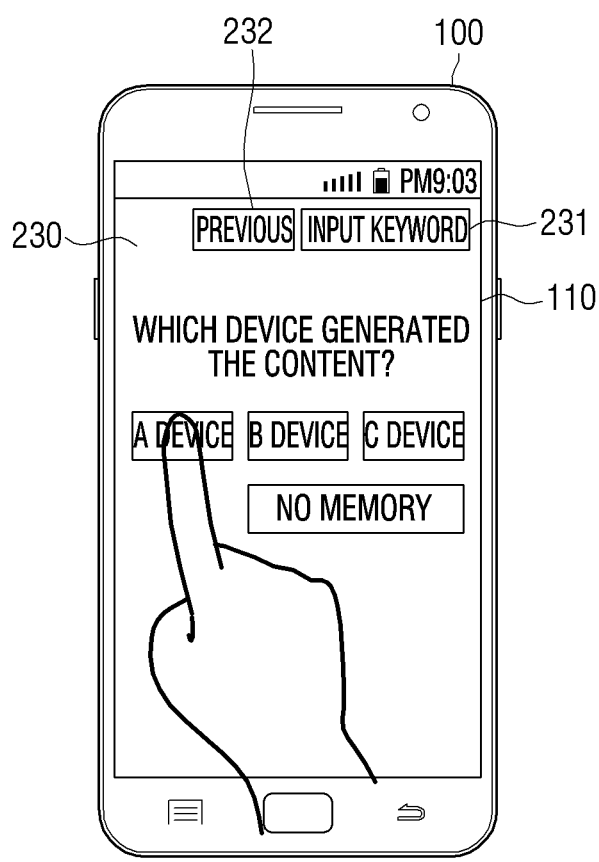

In the above-described exemplary embodiment, sorting criterions for sorting the second, third, fifth, and ninth contents are a content generated location and a content generating device, and the number of sorting groups is greatest when sorting contents based on the content generating device. Therefore, the controller 140 may display a UI screen 230 including a question "Which device generated the content?" and answers "the device A", "the device B", "the device C", and "no memory" to the question, through the display unit 110 as shown in FIG. 10.

If "the device A" is selected on the UI screen 230, the controller 140 determines that contents generated by the device A are the second and third contents, with reference to the attribute information table as shown in Table 3. In this case, since two contents are searched, the two searched contents do not match with the preset condition for outputting the search result. Therefore, the controller 140 repeatedly generates a question for searching for contents and a selectable answer to the question based on the search result and outputs the question and the selectable answer through the display unit 110.

In the above-described exemplary embodiment, a sorting criterion for sorting the second and third contents is the content generated location. Therefore, the controller 140 may display a UI screen 240, including a question "Where was the content generated?" and answers "the area A", "the area B", and "no memory", through the display unit 110 as shown in FIG. 11.

If "the area B" is selected on the UI screen 240, the controller 140 may output the third content generated in the area B among the second and third contents through the display unit 1140.

Figure 11:
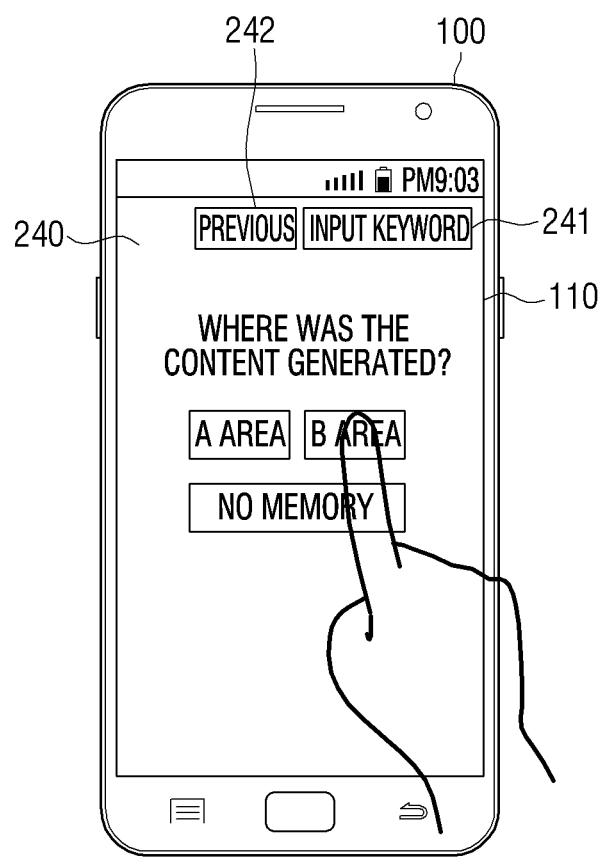
Figure 12:
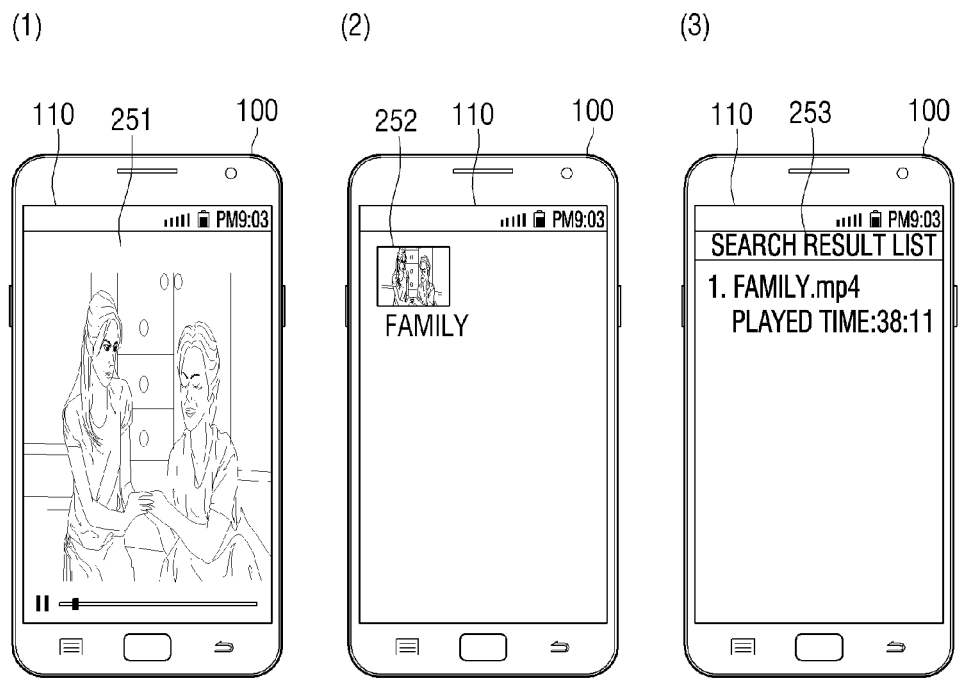

For example, if the searched third content is a moving picture, the controller 140 may automatically play a searched first moving picture 251 as shown in (1) of FIG. 11 or may output a thumbnail image 252 of a searched moving picture along with a title through the display unit 110 as shown in (2) of FIG. 12. Also, the controller 140 may display a list 253 including a title, a played time, etc., of a searched first moving picture as shown in (3) of FIG. 12.

As shown in FIGS. 7 and 9 through 11, the controller 140 may control to display a UI screen, including a question and an answer to the question, along with a GUI (211 of FIG. 7, 211 of FIG. 9, 231 of FIGS. 10, and 241 of FIG. 11) for inputting a search word. Therefore, if the GUI for inputting the search word is displayed, the controller 140 may display a search window on the display unit 110, search for contents corresponding to a search word input through the search window, and output the searched contents through the display unit 110.

Figure 13:
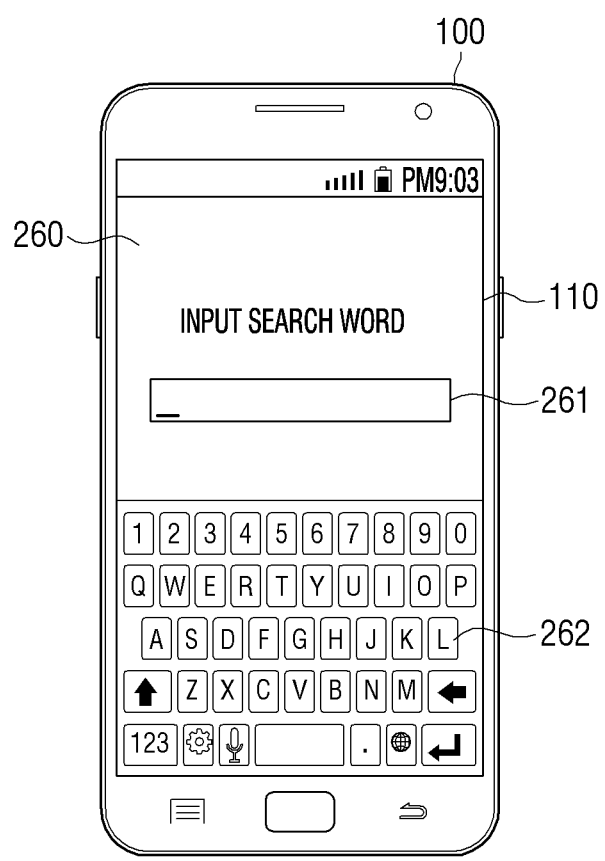

For example, if a GUI 231 for inputting a search word is selected on the UI screen 230 as shown in FIG. 10, a screen 260 including a search window 261 as shown in FIG. 13 may be displayed. In this case, the controller 140 may control to display the screen 260 along with a virtual keyboard 262 for inputting the search word. However, it is understood that one or more exemplary embodiments are not limited to displaying a new screen 260. For example, if the search window 261 is selected on the display screen 230 of FIG. 10, a virtual keyboard may be displayed on the display screen 230, such as in a lower portion of the display screen 230.

Figure 14:
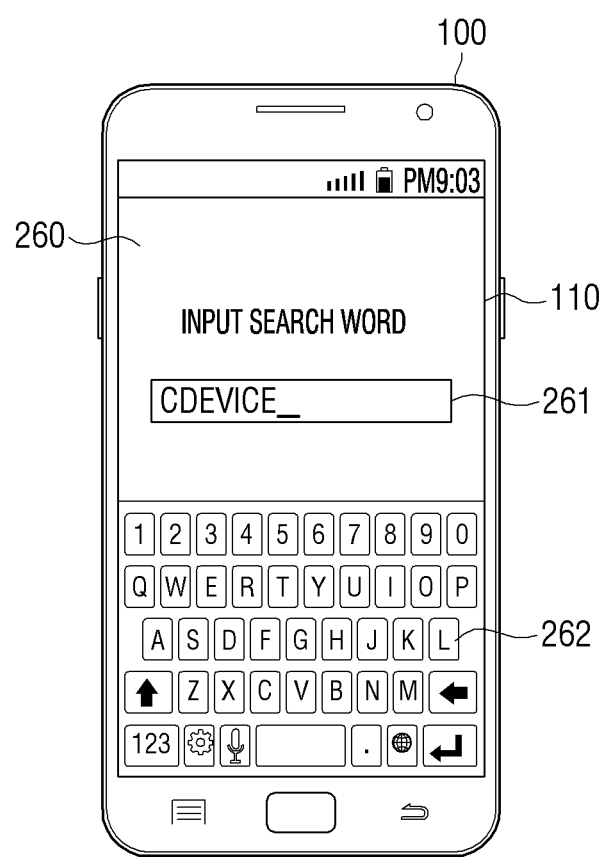
Figure 15:
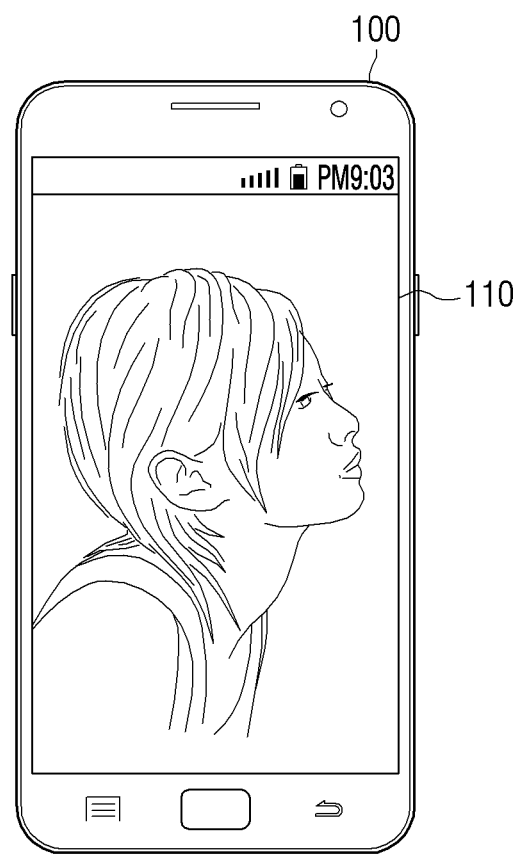

The controller 140 may search for contents corresponding to the input search word. For example, if "morning" is selected as an answer to a question for inquiring a content generated time, the controller 140 searches for contents generated in the morning time range, i.e., contents corresponding to a search word input by the user among the second, third, fifth, and ninth contents. For example, if the device C is input as a search word as shown in FIG. 14, the controller 140 may determine the ninth content generated by the device C among the second, third, fifth, and ninth contents as a content corresponding to the search word and output the ninth content through the display unit 110 as shown in FIG. 15.

As shown in FIGS. 10 and 11, the controller 140 may control a UI screen, including a question and an answer to the question, along with a GUI for inputting a user command outputting a previous UI screen (232 of FIG. 10 or 242 of FIG. 11). Therefore, if the corresponding GUI is selected, the controller 140 may control to display a previously displayed screen, i.e., a UI including a previous question and a plurality of selectable answers to the previous question. For example, if the GUI 232 of FIG. 10 for inputting the user command outputting the previous UI screen when the UI screen 230 is displayed as shown in FIG. 10, the UI screen 210 shown in FIG. 9 may be re-displayed.

Therefore, the user may re-select an answer to a previous question, and the controller 140 may search for contents based on a newly selected answer. For example, the GUI 232 of FIG. 10 for inputting the user command outputting the previous UI screen may be selected when the UI screen 230 shown in FIG. 10 is displayed, to repeatedly display the UI screen 210 as shown in FIG. 9. Here, if the user selects "dawn" on the UI screen 210, the controller 140 may determine that a content generated in the dawn time range is the first content, with reference to an attribute information table and output the first content through the display unit 110.

In the exemplary embodiments shown in FIGS. 7 and 9 through 11, a GUI for searching for contents and a GUI for outputting a previous UI screen are displayed, but this is only an example and it is understood that one or more other exemplary embodiments are not limited thereto. For example, according to another exemplary embodiment, the controller 140 may constitute and display a UI screen including a question and a selectable answer to the question without a GUI for searching for contents and a GUI for outputting a previous UI screen, and, if an additional user control is input, add corresponding GUIs onto the UI screen.

In the above-described exemplary embodiment, a UI screen including one question is displayed. However, as shown in FIG. 16, a UI screen including a plurality of questions may be displayed, and this may be set and changed by the user.

Figure 16:
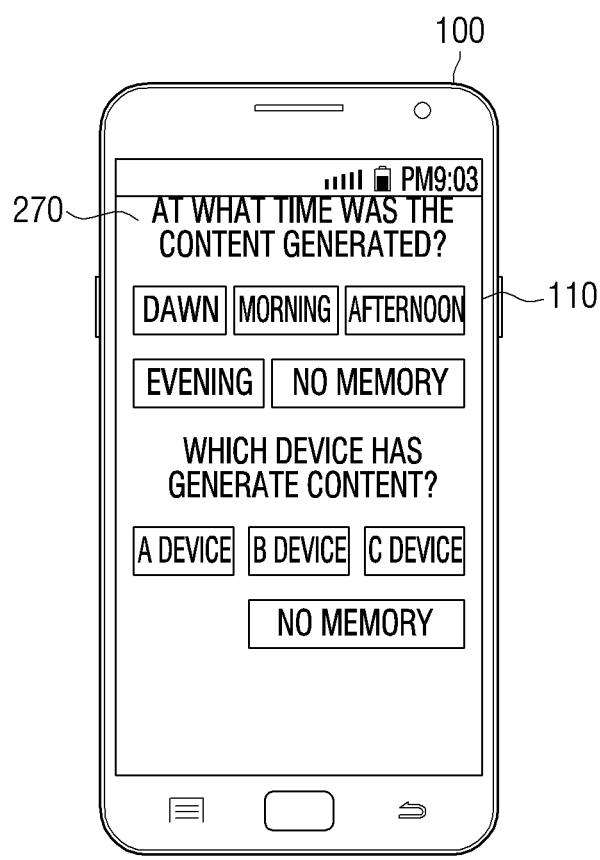

For example, as shown in FIG. 16, the controller 140 may display a UI screen 270 including a question for inquiring a content generated time in which the number of sorting groups is greatest, an answer to the question, a question for inquiring a content generating device in which the number of sorting groups is the second greatest, and an answer to the question.

Figure 17:
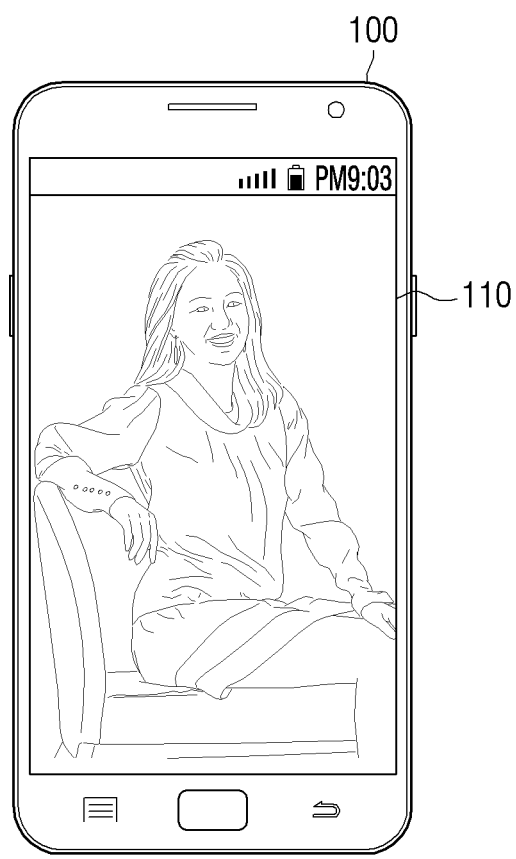

Therefore, if an answer to each question is selected, the controller 140 may search for contents corresponding to the selected answer. For example, "dawn" and "device B" may be selected when the UI screen 260 shown in FIG. 16 is displayed. In this case, the controller 140 determines that contents generated in the dawn time range are the second, third, fifth, and ninth contents, with reference to the attribute information table, and searches for contents generated by the device B among the second, third, fifth, and ninth contents. Therefore, as shown in FIG. 17, the controller 140 may output a searched fourth content through the display unit 110.

If a user command for skipping a corresponding question is input on a UI screen, the controller 140 may generate a question about a sorting criterion in which the number of sorting groups is the greatest as compared to a sorting criterion used for generating a skipped question and a plurality of options selectable as answers to the question and output the question and the plurality of options through the display unit 110. For example, if the user selects "no memory" when the UI screen 210 shown in FIG. 9 is displayed, the controller 140 may display a UI screen, including a question for inquiring a content generating device in which the number of sorting groups is second greatest and a selectable answer to the question, through the display unit 110.

As shown in FIGS. 13 through 15, a UI screen, including a question for searching for contents and a selectable answer to the question, is displayed, and then a search word is input. However, before the UI screen for searching for the contents, the search word may be input.

Figure 18:
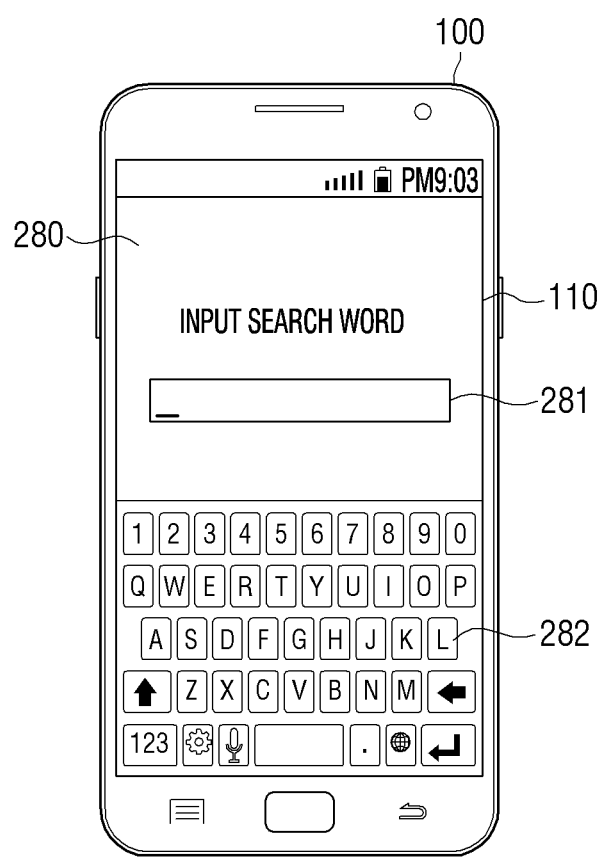

For example, if the user touches an icon for searching for contents displayed on a home screen, the controller 140 may display a screen, including a search window 281 and a virtual keyboard 282 as shown in FIG. 18, on the display unit 110.

Figure 19:
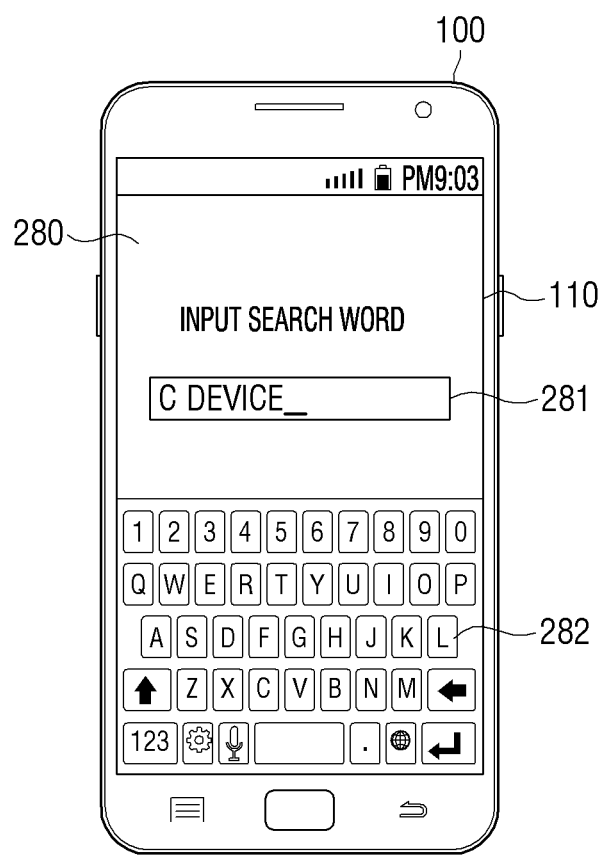
Figure 20:
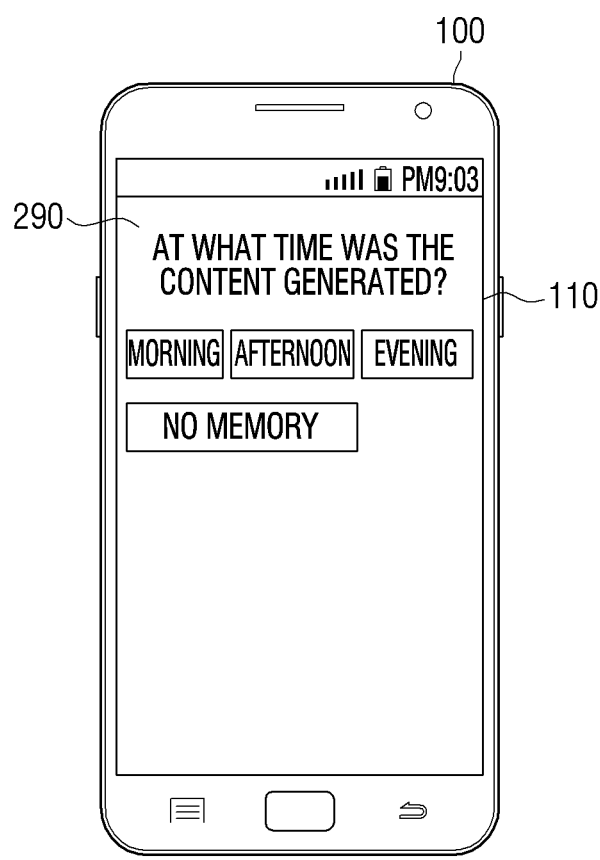
Figure 21:
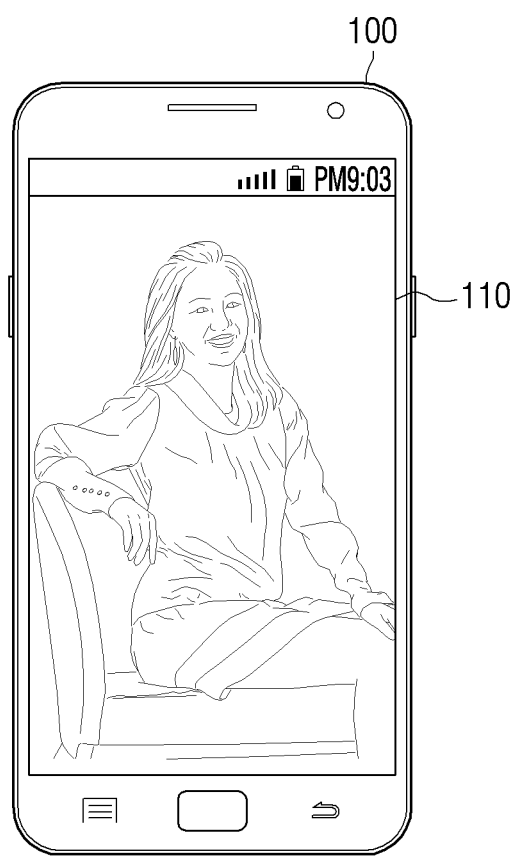

The controller 140 may generate and output a question for searching for contents and an answer to the question based on a search word input into the search window 281. For example, if the device C is input into the search window 281 as shown in FIG. 19, the controller 140 searches for contents generated by the device C. The controller 140 may output a UI screen, including a question for inquiring a sorting criterion in which the number of sorting groups is greatest when sorting searched fourth, eighth, and ninth contents, i.e., a content generated time, and a selectable answer to the question, through the display unit 110. In other words, the fourth, eighth, and ninth contents may be sorted into morning, afternoon, and evening groups according to the content generated time. Therefore, as shown in FIG. 20, the controller 140 may display a UI screen 290, including a question "At what time was the content generated?" and answers "morning", "afternoon", "evening", and "no memory", through the display unit 110. The controller 140 may search for contents matching with an answer selected on the UI screen 290 among the fourth, eighth, and ninth contents. For example, if the user selects "afternoon", the controller 140 searches for contents generated in the afternoon time range among the fourth, eighth, and ninth contents searched according to the search word, with reference to the attribute information table. Therefore, as shown in FIG. 21, the controller 140 may output the searched fourth content through the display unit 110.

Figure 22:
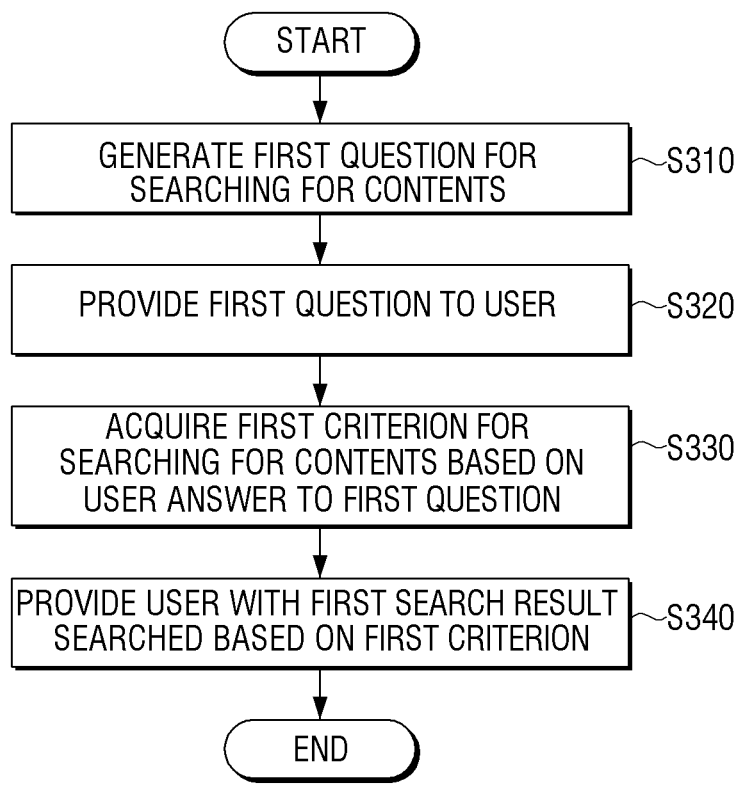
FIG. 22 is a flowchart illustrating a content searching method according to an exemplary embodiment.

FIG. 22 is a flowchart illustrating a method of searching for contents according to an exemplary embodiment. In particular, the present exemplary embodiment provides a content searching method of a device that stores a plurality of contents.

In operation S310, a first question for searching for contents is generated based on a plurality of contents. Here, the plurality of contents may include at least one of an image and a moving picture.

In detail, a plurality of sorting criterions for sorting the plurality of contents may be checked or determined based on metadata about each of the plurality of contents, and the first question may be generated based on the number of sorting groups that has been sorted according to each sorting criterion. For example, a question about a sorting criterion in which the number of sortable sorting groups is greatest may be generated as the first question.

In operation S320, the first question is provided to a user. In this case, the user may provide a plurality of options selectable as answers to the first question.

In operation S330, a first criterion for searching for contents is acquired based on a user answer to the first question. In operation S340, a first search result searched based on the first criterion is provided to the user. For example, contents searched according to the first criterion may be played or a list of contents searched according to the first criterion may be displayed. Here, the list of contents may include titles, generated times, played times, thumbnail images, etc., of the contents.

In the present exemplary embodiment, a UI for searching for contents may be displayed, and if a search word is input through the UI, contents corresponding to the search word may be extracted or determined. In this case, the first question may be generated based on the extracted contents.

Figure 23:
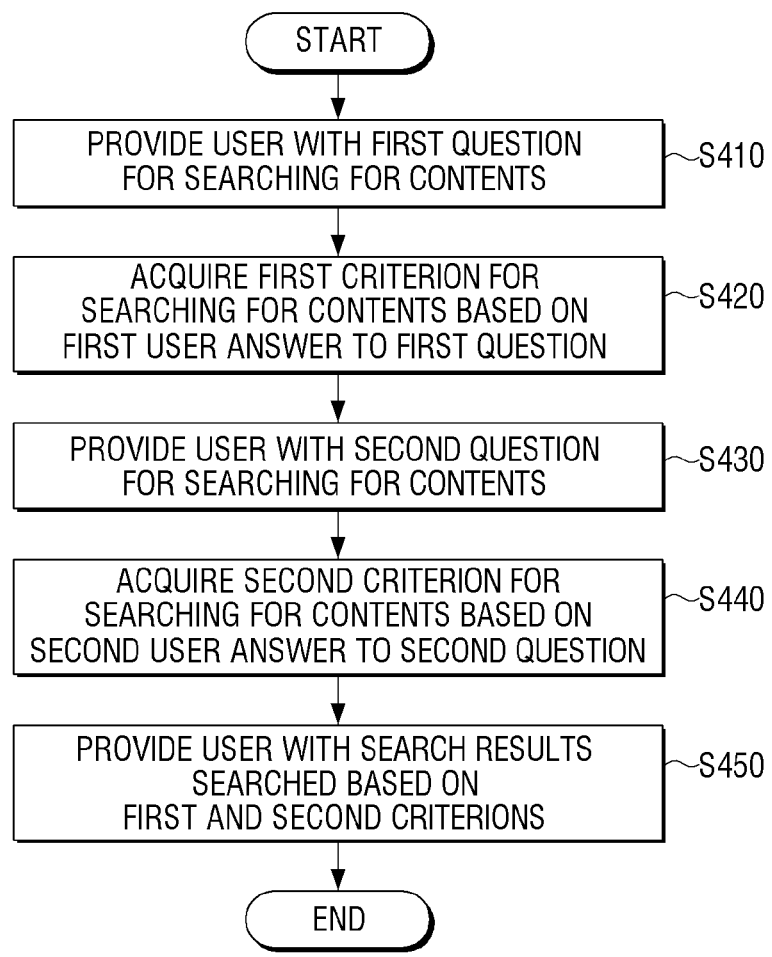
FIG. 23 is a flowchart illustrating a content searching method according to another exemplary embodiment.

FIG. 23 is a flowchart illustrating a content searching method according to an exemplary embodiment. In particular, the present exemplary embodiment provides a content searching method of a device that stores a plurality of contents.

In operation S410, a first question for searching for contents is provided based on a plurality of contents. In this case, a plurality of options selectable as answers to the first question may be provided. In operation S420, a first criterion for searching for contents is acquired based on a first user answer to the first question.

In operation S430, a second question for searching for contents is provided to the user. In this case, a plurality of options selectable as answers to the second question may be provided.

In detail, contents corresponding to the first criterion may be searched among a plurality of contents. Also, if the number of contents corresponding to the first criterion are greater than or equal to a preset number, a second question may be generated based on a first search result. In more detail, a sorting criterion for sorting the contents corresponding to the first criterion may be checked based on metadata of each of the contents corresponding to the first criterion. Also, the second question may be generated based on the number of sorting groups sortable according to each sorting criterion. In this case, a question about a sorting criterion in which the number of sortable sorting groups is greatest may be generated as the second question.

In operation S440, a second criterion for searching for contents is acquired based on a second user answer to the second question. In operation S450, results searched based on the first and second criterions are provided to the user.

In the present exemplary embodiment, a method of generating a first question and a method of providing a searched result to a user are the same as, or similar to, those described with reference to FIG. 21. Furthermore, in the present exemplary embodiment, a UI for searching for contents may be displayed. Also, if a search word is input through the UI, contents corresponding to the search word may be extracted, and a first or second question may be generated based on the extracted contents.

According to various exemplary embodiments as described above, a question for searching for contents based on metadata of contents and an answer to the question may be provided to a user. Also, contents corresponding to the question and the answer may be searched for and provided based on an answer of the user. Therefore, contents may be further easily and accurately searched for and provided to users.

There may be provided a non-transitory computer-readable medium that stores a program that sequentially performs a content searching method according to one or more exemplary embodiments.

The non-transitory computer-readable medium may refer to a medium that semi-permanently stores data and is readable by a device. For example, the above-described applications or programs may be stored and provided on a non-transitory computer readable medium such as a CD, a DVD, a hard disk, a blue-ray disk, a universal serial bus (USB), a memory card, a ROM, or the like.

Also, a bus is not shown in block diagrams illustrating a display device, but communications between elements of the display device may be performed through the bus. In addition, the display device may further include a CPU that performs various operations described above and a processor such as a microprocessor or the like.

The foregoing exemplary embodiments are merely exemplary and are not to be construed as limiting. The present teaching can be readily applied to other types of devices. Also, the description of exemplary embodiments is intended to be illustrative, and not to limit the scope of the claims, and many alternatives, modifications, and variations will be apparent to those skilled in the art.

What is claimed is:

1. A device comprising:
a display configured to display a user interface (UI) for searching for content;
a storage configured to store a plurality of contents and corresponding metadata for each of the plurality of contents;
an input interface configured to receive user inputs; and
a hardware processor configured to:
identify a sorting criterion from among a plurality of sorting criteria for sorting the plurality of contents into a plurality of content groups based on the corresponding metadata, wherein
the corresponding metadata associated with each content in a content group is similar to other metadata of other contents in the same content group, and
a number of contents groups for the identified sorting criterion is greatest;
automatically generate a question based on the identified sorting criterion;
control the display to display the question;
control the input interface to receive a user input as an answer to the question;
search for matching content corresponding to the answer to the question from the plurality of contents in the storage; and
control the display to display the content matching the answer to the question.

2. The device of claim 1, wherein the hardware processor is further configured to control the display to display a plurality of answers selectable to the question and determine, in response to receiving a user input for selecting one of the plurality of answer, the selected answer as the answer to the question, and
wherein the plurality of answers selectable corresponding to the question are determined based on the metadata of the plurality of contents related to the sorting criterion.

3. The device of claim 1, wherein, when the plurality of contents is searched based on the answer, the hardware processor is further configured to:
identify an additional sorting criterion from among the remaining of the plurality of sorting criteria for sorting the plurality of searched contents into content groups based on corresponding metadata of the plurality of searched contents, wherein a number of content groups for the additional sorting criterion is greatest;
control the display to display another question based on the additional sorting criterion;
control the input interface to receive an answer to the other question;

search for matching content corresponding to the answer to the other question from the plurality of searched contents; and control the display to display the content matching the answer to the other question.

4. The device of claim 1, wherein the hardware processor is further configured to:

identify an additional sorting criterion from among the remaining of the plurality of sorting criteria for sorting the plurality of contents into content groups based on corresponding metadata of the plurality of searched contents, wherein a number of content groups for the additional sorting criterion is second greatest;

control the display to display a first question based on the sorting criterion and a second question based on the additional sorting criterion;

control the input interface to receive answers to the first question and the second question;

search for matching content corresponding to the answers to the first question and the second question from the plurality of contents in the storage; and control the display to display the content matching the first question and the second question.

5. The device of claim 1, wherein, when a user input for skipping the question is received, the hardware processor is further configured to:

identify an additional sorting criterion from among the remaining of the plurality of sorting criteria for sorting the plurality of contents into content groups based on corresponding metadata of the plurality of searched contents, wherein a number of content groups for the additional sorting criterion is second greatest;

control the display to display another question based on the additional sorting criterion;

control the input interface to receive an answer to the question;

search for matching content corresponding to the answer to the other question from the plurality of contents; and control the display to display the content matching the answer to the other question.

6. A method of searching for content of a device, the device configured to store a plurality of contents and corresponding metadata, the method comprising:

identifying a sorting criterion from among a plurality of sorting criteria for sorting the plurality of contents into a plurality of content groups based on the corresponding metadata, wherein the corresponding metadata associated with each content in a content group is similar to other metadata of other contents in the same content group, and a number of content groups for the identified sorting criterion is greatest;

automatically generating a question based on the identified sorting criterion;

displaying the question;

in response to receiving an answer to the question, searching for matching content corresponding to the answer to the question from the plurality of contents in the device; and displaying the content matching the answer to the question.

7. The method of claim 6, further comprising:

displaying a plurality of answer selectable to the question; and in response to receiving a user input for selecting one of the plurality of answers, determining the selected answer as the answer to the question, and wherein the plurality of answers selectable corresponding to the question are determined based on the metadata of the plurality of contents related to the sorting criterion.

8. The method of claim 6, further comprising:

when the plurality of contents is searched based on the answer, identify an additional sorting criterion from among the remaining of the plurality of sorting criteria for sorting the plurality of searched contents into content groups based on corresponding metadata of the plurality of searched contents, wherein a number of content groups for the additional sorting criterion is greatest;

displaying another question based on the additional sorting criterion;

in response to receiving an answer to the other question, search for matching content corresponding to the answer to the question from the plurality of searched contents; and displaying the content matching the answer to the other question.

9. The method of claim 6, further comprising:

identifying an additional sorting criterion from among the remaining of the plurality of sorting criteria for sorting the plurality of searched contents into content groups based on corresponding metadata of the plurality of searched contents, wherein a number of content groups for the additional sorting criterion is second greatest, and wherein the displaying displays a first question based on the sorting criterion and a second question based on the additional sorting criterion, wherein the searching, in response to answers to the first question and the second question, searches for matching content corresponding to the answers to the first question and the second question from the plurality of contents, and wherein the displaying displays the content matching the answers to the first question and the second question.

10. The method of claim 6, further comprising:

when a user input for skipping the question is received, identifying an additional sorting criterion from among the remaining of the plurality of sorting criteria for sorting the plurality of searched contents into content groups based on the metadata of the plurality of searched contents, wherein a number of content groups for the additional sorting criterion is second greatest;

displaying another question based on the additional sorting criterion;

in response to an answer to the other question, searching for matching content corresponding to the answer to the other question from the plurality of contents; and displaying to display the content matching the answer to the other question.

11. A non-transitory machine-readable, tangible storage medium storing executable instructions which cause a device configured to store a plurality of contents and corresponding metadata to perform a method of searching for content, the method comprising:

identifying a sorting criterion from among a plurality of sorting criteria for sorting the plurality of contents into a plurality of content groups based on the corresponding metadata, wherein the corresponding metadata associated with each content in a content group is similar to other metadata of other contents in the same content group, and a number of content groups for the identified sorting criterion is greatest;

automatically generating a question based on the identified sorting criterion;

displaying the question;

in response to receiving an answer to the question, searching for matching content corresponding to the answer to the question from the plurality of contents in the device; and displaying the content matching the answer to the question.

12. The storage medium of claim 11, the method further comprising:

displaying a plurality of answer selectable to the question; and in response to receiving a user input for selecting one of the plurality of answer, determining the selected answer as the answer to the question, and wherein the plurality of answers selectable corresponding to the question are determined based on the metadata of the plurality of contents related to the sorting criterion.

13. The storage medium of claim 11, the method further comprising:

when the plurality of contents is searched based on the answer, identify an additional sorting criterion from among the remaining of the plurality of sorting criteria for sorting the plurality of searched contents into content groups based on corresponding metadata of the plurality of searched contents, wherein a number of content groups for the additional sorting criterion is greatest;

displaying another question based on the additional sorting criterion;

in response to receiving an answer to the other question, searching for matching content corresponding to the answer to the question from the plurality of searched contents; and displaying the content matching the answer to the question.

14. The storage medium of claim 11, the method further comprising:

identifying an additional sorting criterion from among the remaining of the plurality of sorting criteria for sorting the plurality of searched contents into content groups based on corresponding metadata of the plurality of searched contents, wherein a number of content groups for the additional sorting criterion is second greatest, and wherein the displaying displays a first question based on the sorting criterion and a second question based on the additional sorting criterion, wherein the searching, in response to answers to the first question and the second question, searches for matching content corresponding to the answers to the first question and the second question from the plurality of contents, and wherein the displaying displays the content matching the answers to the first question and the second question.

15. The storage medium of claim 11, the method further comprising:

when a user input for skipping the question is received, identifying an additional sorting criterion from among the remaining of the plurality of sorting criteria for sorting the plurality of searched contents into content groups based on the metadata of the plurality of searched contents, wherein a number of content groups for the additional sorting criterion is second greatest;

displaying another question based on the additional sorting criterion;

in response to an answer to the other question, searching for matching content corresponding to the answer to the other question from the plurality of contents; and displaying the content matching the answer to the other question.

* * * * *